(12) United States Patent
Isomura

(10) Patent No.: US 7,969,454 B2
(45) Date of Patent: Jun. 28, 2011

(54) COMPOSITE PHOTOGRAPH CREATION SYSTEM AND COMPOSITE PHOTOGRAPH CREATION APPARATUS

(75) Inventor: Ayumu Isomura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 925 days.

(21) Appl. No.: 11/884,202

(22) PCT Filed: Dec. 13, 2005

(86) PCT No.: PCT/JP2005/023202
§ 371 (c)(1),
(2), (4) Date: Oct. 15, 2007

(87) PCT Pub. No.: WO2006/064933
PCT Pub. Date: Jun. 22, 2006

(65) Prior Publication Data
US 2008/0266322 A1    Oct. 30, 2008

(30) Foreign Application Priority Data
Dec. 17, 2004    (JP) .................................. 2004-366581

(51) Int. Cl.
*G09G 5/00* (2006.01)
(52) U.S. Cl. .......................................... 345/641; 358/1.1
(58) Field of Classification Search .................. None
See application file for complete search history.

(56) References Cited

U.S. PATENT DOCUMENTS

| | | | | |
|---|---|---|---|---|
| 6,539,420 B1 * | 3/2003 | Fields et al. | | 709/206 |
| 2001/0048774 A1 * | 12/2001 | Seki et al. | | 382/305 |
| 2003/0046363 A1 | 3/2003 | Ezato | | |
| 2003/0055871 A1 * | 3/2003 | Roses | | 709/203 |
| 2003/0133628 A1 * | 7/2003 | Lee | | 382/309 |
| 2004/0165063 A1 | 8/2004 | Iida et al. | | |
| 2005/0266839 A1 * | 12/2005 | Paul et al. | | 455/418 |
| 2006/0119885 A1 * | 6/2006 | Jeon et al. | | 358/1.15 |
| 2006/0197963 A1 * | 9/2006 | Royal et al. | | 358/1.2 |
| 2008/0176547 A1 * | 7/2008 | Paul et al. | | 455/418 |
| 2010/0169422 A1 * | 7/2010 | Kuwata et al. | | 709/204 |

FOREIGN PATENT DOCUMENTS

| JP | 10-210340 A | 8/1998 |
|---|---|---|
| JP | 2000-22929 A | 1/2000 |
| JP | 2000-168187 A | 6/2000 |
| JP | 2000-250854 A | 9/2000 |
| JP | 2002-335286 A | 11/2002 |
| JP | 2003-85089 A | 3/2003 |
| JP | 2004-178163 A | 6/2004 |
| JP | 2004-260304 A | 9/2004 |
| JP | 2004-272880 A | 9/2004 |

* cited by examiner

*Primary Examiner* — Andrew Wang
*Assistant Examiner* — David H Chu
(74) *Attorney, Agent, or Firm* — Birch, Stewart, Kolasch & Birch, LLP

(57) ABSTRACT

A composite photograph creation system creates a composite photograph by pasting a user image at a previously determined user image combination position on a template image. The system comprises: a user terminal which sends the user image to one of transmission destinations independently assigned to a plurality of template images; a reception device which receives the user image sent to the one of transmission destinations; and a composite photograph creation device which creates the composite photograph by pasting the user image received by the reception device, at the user image combination position on one of the template images, in accordance with the transmission destination of the user image.

6 Claims, 24 Drawing Sheets

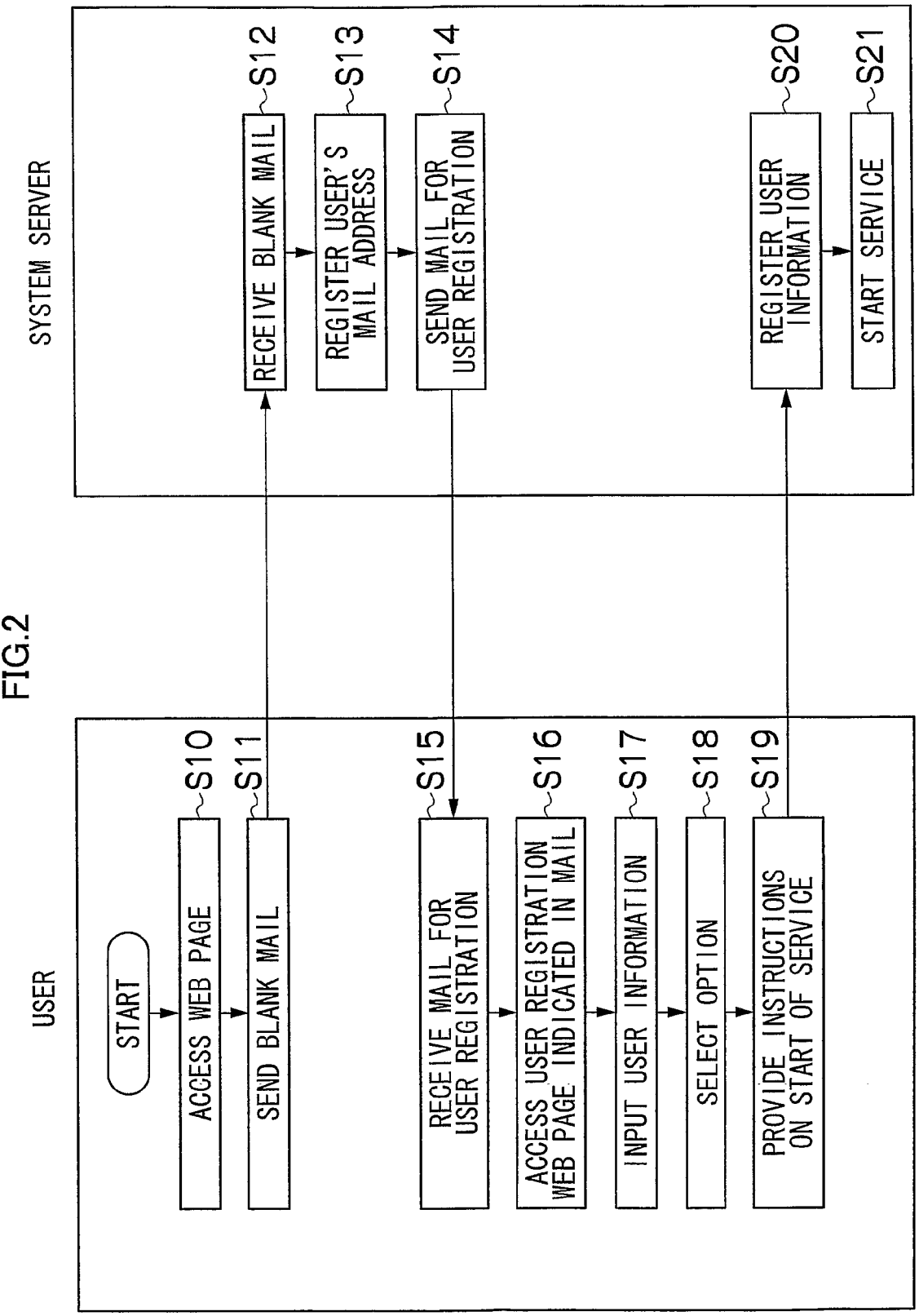

FIG.3A

TAKE PICTURES WITH YOUR PHONE AND SEND THEM TO THE MOBILE SNAPSHOT RALLY

DESCRIPTION OF THE MOBILE SNAPSHOT RALLY

TAKE PHOTOS IN THE EXHIBITION HALL OF THE ROBOTS, AMUSING SCENES, OR ANY OTHER PICTURE YOU LIKE AND SEND THEM IN TO CREATE A TRULY UNIQUE PRINT! YOU CAN TAKE PART IN THE RALLY AND VIEW YOUR PRINT, FREE OF CHARGE.

■START HERE

OPTION DESCRIPTION

■SNAP ROBOTS!
■MY TOP THREE FAVORITES
■TOTALLY HILARIOUS!! HAVE A GOOD LAUGH!!

FIG.3B

REGISTRATION PROCEDURE (1) CLICK ON "SEND MAIL" BELOW TO OPEN UP THE EMAIL SCREEN.

(2) SEND THE EMAIL JUST AS IT IS, WITHOUT CHANGING THE ADDRESS.

(3) SOON, YOU'LL RECEIVE AN REPLY MAIL. CLICK ON THE URL GIVEN IN THAT MAIL, AND COMPLETE USER REGISTRATION.

■SEND MAIL

FIG.3C

RECEIVED SAT 12/25 09:00
From rally.jp
Subject : Register here

Click on the link below to complete user registration.

http://ffsmcm/dirue/arue
areii/weio/io.ne.jp

FIG.4

| MAIL ADDRESS | ENTRANCE TICKET ID | GENDER | AGE GROUP | OPTION | PHOTO NO. 1 | PHOTO NO. 2 | PHOTO NO. 3 | FACE IMAGE | COMPOSITE PHOTOGRAPH IMAGE |
|---|---|---|---|---|---|---|---|---|---|
| abcdef @vphone.ne.jp | 0123456781 | MALE | 10 | SNAP ROBOTS! | abc001 | abc002 | abc003 | abc004 | compo1 |
| ghijki @tphone.ne.jp | 0123456782 | FEMALE | 20 | MY TOP THREE FAVORITES | abc001 | abc002 | abc003 | abc004 | compo1 |
| mnopq @dphone.ne.jp | 0123456783 | MALE | 10 | SNAP ROBOTS | abc001 | abc002 | abc003 | abc004 | compo1 |
| rstuvw @vphone.ne.jp | 0123456784 | MALE | 20 | TOTALLY HILARIOUS!! HAVE A GOOD LAUGH!! | abc001 | abc002 | abc003 | abc004 | compo1 |

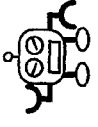

REGISTRATION INFORMATION INPUT SCREEN

PLEASE ENTER THE 12-DIGIT ID NUMBER ON YOUR ENTRANCE TICKET, YOUR GENDER, AND AGE GROUP, THEN CLICK ON "NEXT"

ENTRANCE TICKET ID (12 DIGITS)

GENDER
PLEASE SELECT

AGE GROUP
PLEASE SELECT

NEXT

FIG.5B

OPTION SELECTION SCREEN

CLICK ON ONE OF THE FOLLOWING OPTIONS TO DISPLAY AN OPTION DESCRIPTION SCREEN. AFTER READING THE DESCRIPTION, YOU CAN START THAT OPTION, FROM THE OPTION DESCRIPTION SCREEN.

■ SNAP ROBOTS!
■ MY TOP THREE FAVORITES
■ TOTALLY HILARIOUS!! HAVE A GOOD LAUGH!!

■ RETURN

FIG.5C

DESCRIPTION OF OPTION

ABOUT "SNAP ROBOTS!"
■ TAKE PART

1) TAKE THREE PICTURES OF ROBOTS AND ONE PICTURE OF YOUR FACE, AND SEND THEM IN BY EMAIL. WE WILL CREATE A UNIQUE PRINT.
*ROBOZO AND ROBOTA WILL HELP TO GUIDE YOU THROUGH THE PICTURE RALLY.
2) YOU CAN VIEW YOUR UNIQUE PRINT AT THE EXHIBITION HALL'S SERVICE DESK, FREE OF CHARGE. YOU CAN BUY THE PRINT, IF YOU WANT.
3) PRICE
PRINT
(WITH UNIQUE FRAME)
500 YEN
RALLY ENTRY AND PRINT VIEWING : FREE OF CHARGE

■ TAKE PART
■ RETURN

FIG.5D

RALLY START SCREEN

HELLO, I'M ROBOTA! TIME TO START TAKING PICTURES!

ROBOZO AND I WILL SHOW YOU THE WAY. NICE TO MEET YOU. FIRST, YOU SHOULD GET INSTRUCTIONS FROM ROBOZO. CHECK YOUR MAIL LATER ON!

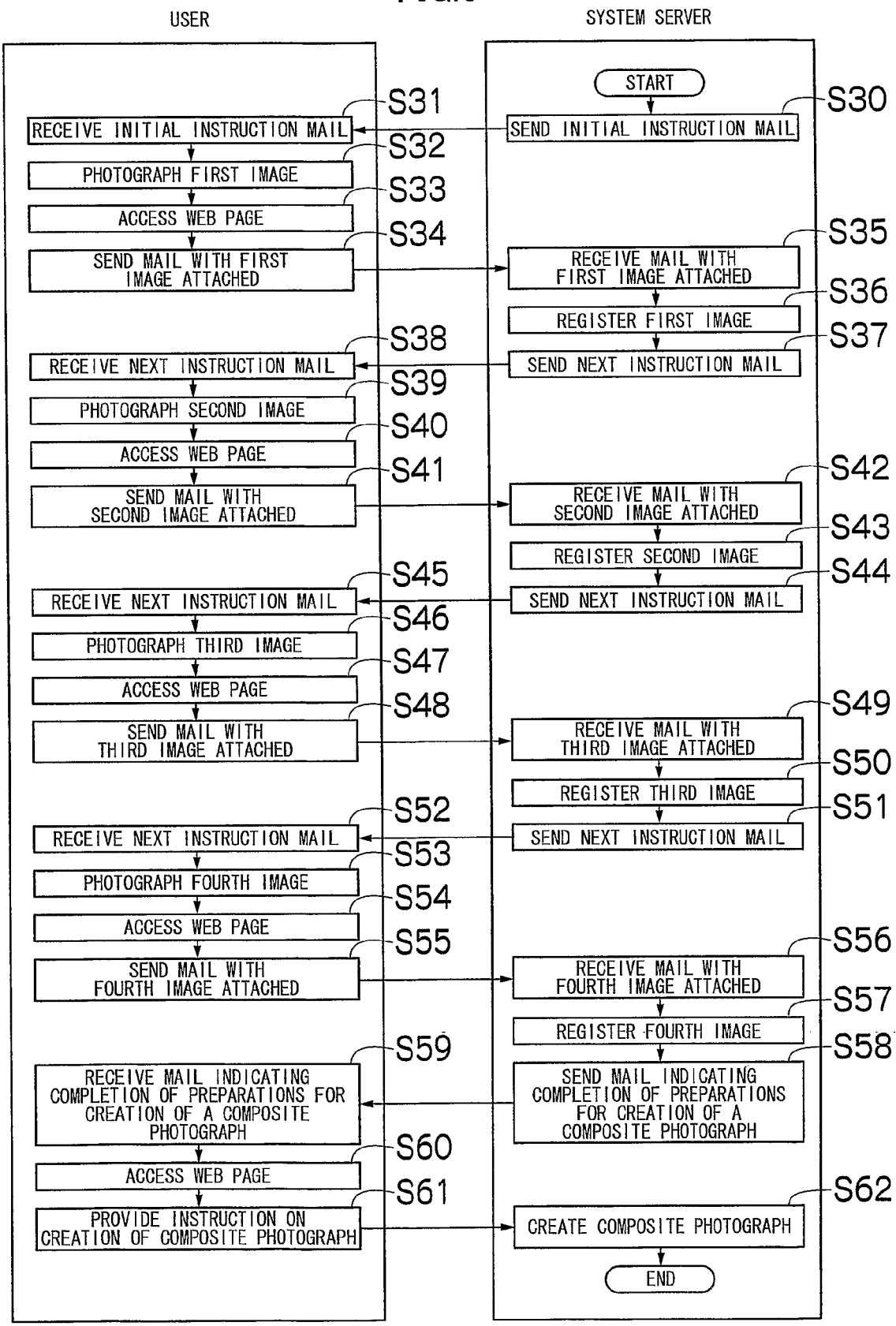

FIG.11

| TEMPLATE IMAGE | COMBINATION POSITION | MAIL ADDRESS |
|---|---|---|
| SNAP ROBOTS! | PHOTO NO. 1 | template1_compo1@event1.***.co.jp |
| | PHOTO NO. 2 | template1_compo2@event1.***.co.jp |
| | PHOTO NO. 3 | template1_compo3@event1.***.co.jp |
| | PHOTOGRAPHER'S FACE | template1_compo4@event1.***.co.jp |
| MY TOP THREE FAVORITES | PHOTO NO. 1 | template2_compo1@event1.***.co.jp |
| | PHOTO NO. 2 | template2_compo2@event1.***.co.jp |
| | PHOTO NO. 3 | template2_compo3@event1.***.co.jp |
| | PHOTOGRAPHER'S FACE | template2_compo4@event1.***.co.jp |
| TOTALLY HILARIOUS!! HAVE A GOOD LAUGH!! | PHOTO NO. 1 | template3_compo1@event1.***.co.jp |
| | PHOTO NO. 2 | template3_compo2@event1.***.co.jp |
| | PHOTO NO. 3 | template3_compo3@event1.***.co.jp |

FIG.13

| | | | COMBINATION POSITION | | | |
|---|---|---|---|---|---|---|
| | | | PHOTO NO. 1 | PHOTO NO. 2 | PHOTO NO. 3 | PHOTO NO. 4 |
| SEQUENCE OF EMAILS | 1ST MAIL | A | FIRST PICTURE RECEIVED! | | | |
| | | B | ROBOZO HERE. I GOT A PICTURE FROM YOU! IT'S GREAT! | | | |
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | THERE ARE STILL 3 TO GO! WE'VE ONLY JUST STARTED! YOU CAN ALSO GET TO THE "SEND PHOTO" PAGE VIA THIS LINK! http://fsmcm/darue/seou seu/fheour/io.ne.jp | | | |
| | 2ND MAIL | A | SECOND PICTURE RECEIVED! | | | |
| | | B | ROBOZO HERE. THAT'S A GREAT PHOTO TOO! | | | |
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | STILL 2 TO GO! I'M WAITING! YOU CAN ALSO GET TO THE "SEND PHOTO" PAGE VIA THIS LINK! http://fsmcm/darue/seou seu/fheour/io.ne.jp | | | |
| | 3RD MAIL | A | THIRD PICTURE RECEIVED! | | | |
| | | B | ROBOZO HERE. I GOT YOUR PHOTO! ANOTHER GOOD ONE! | | | |
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | JUST ONE TO GO! WE'VE NEARLY FINSHED!! YOU CAN ALSO GET TO THE "SEND PHOTO" PAGE VIA THIS LINK! http://fsmcm/darue/seou seu/fheour/io.ne.jp | | | |
| | 4TH MAIL | A | FOURTH PICTURE RECEIVED! | | | |
| | | B | ROBOZO HERE. I GOT THE LAST PHOTO! RECEIVED SAFELY! | | | |
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | THAT'S ALL THE PHOTOS WE NEED. I'LL GET ROBOTA TO MAKE A PRINT http://fsmcm/darue/seou seu/fheour/io.ne.jp | | | |

FIG.16A

RECEIVED SAT 12/25 10:00
From : Robozo.rally.jp
Subject : SECOND
          PICTURE RECEIVED!

ROBOZO HERE.
THAT'S A GREAT PHOTO TOO!
YOU ARE VERY GOOD AT THIS!
THIS WILL MAKE A FANTASTIC
PRINT.
STILL 2 TO GO!
I'M WAITING!

YOU CAN ALSO GET TO THE
"SEND PHOTO" PAGE VIA
THIS LINK!

http://fsmcm/darue/seou
seu/fheour/io.ne.jp

FIG.16B

"SEND PHOTO" PAGE

ROBOTA CALLING!
APPARENTLY YOU'VE SENT
YOUR SECOND PHOTOGRAPH
SAFELY!
TO SEND ANOTHER PHOTOGRAPH,
PRESS "SEND PHOTO"
AND THEN SEND IT BY
SELECTING "ATTACH PHOTO
TO MAIL". WHEN YOU'VE
SENT IT, WAIT FOR ANOTHER
EMAIL FROM ROBOZO.

■HOW TO SEND PHOTOS

PHOTO NO.1
■CONFIRM/CHANGE PHOTO

PHOTO NO.2
■CONFIRM/CHANGE PHOTO

PHOTO NO.3
■SEND PHOTO

PHOTOGRAPHER'S FACE
■SEND PHOTO

FIG.17A

RECEIVED  SAT 12/25 10:00
From : Robozo.rally.jp
Subject : THIRD
         PICTURE RECEIVED!
---
ROBOZO HERE.
I GOT YOUR PHOTO!
ANOTHER GOOD ONE!
THAT'S A REALLY CHARMING
PICTURE!
JUST ONE TO GO! WE'VE
NEARLY FINISHED!

YOU CAN ALSO GET TO THE
"SEND PHOTO" PAGE VIA
THIS LINK!

http://fsmcm/darue/seou
seu/fheour/io.ne.jp

FIG.17B

"SEND PHOTO" PAGE

ROBOTA CALLING!
ROBOZO SAID YOUR THIRD
PHOTO WAS REALLY GOOD TOO.
WHEN YOU'VE TAKEN THE
LAST PICTURE, PRESS
"SEND PHOTO", AND THEN
SEND IT BY SELECTING
"ATTACH PHOTO TO MAIL".
WHEN YOU'VE SENT IT,
WAIT FOR ANOTHER EMAIL
FROM ROBOZO.

■HOW TO SEND PHOTOS

PHOTO NO.1
■CONFIRM/CHANGE PHOTO

PHOTO NO.2
■CONFIRM/CHANGE PHOTO

PHOTO NO.3
■CONFIRM/CHANGE PHOTO

PHOTOGRAPHER'S FACE
■SEND PHOTO

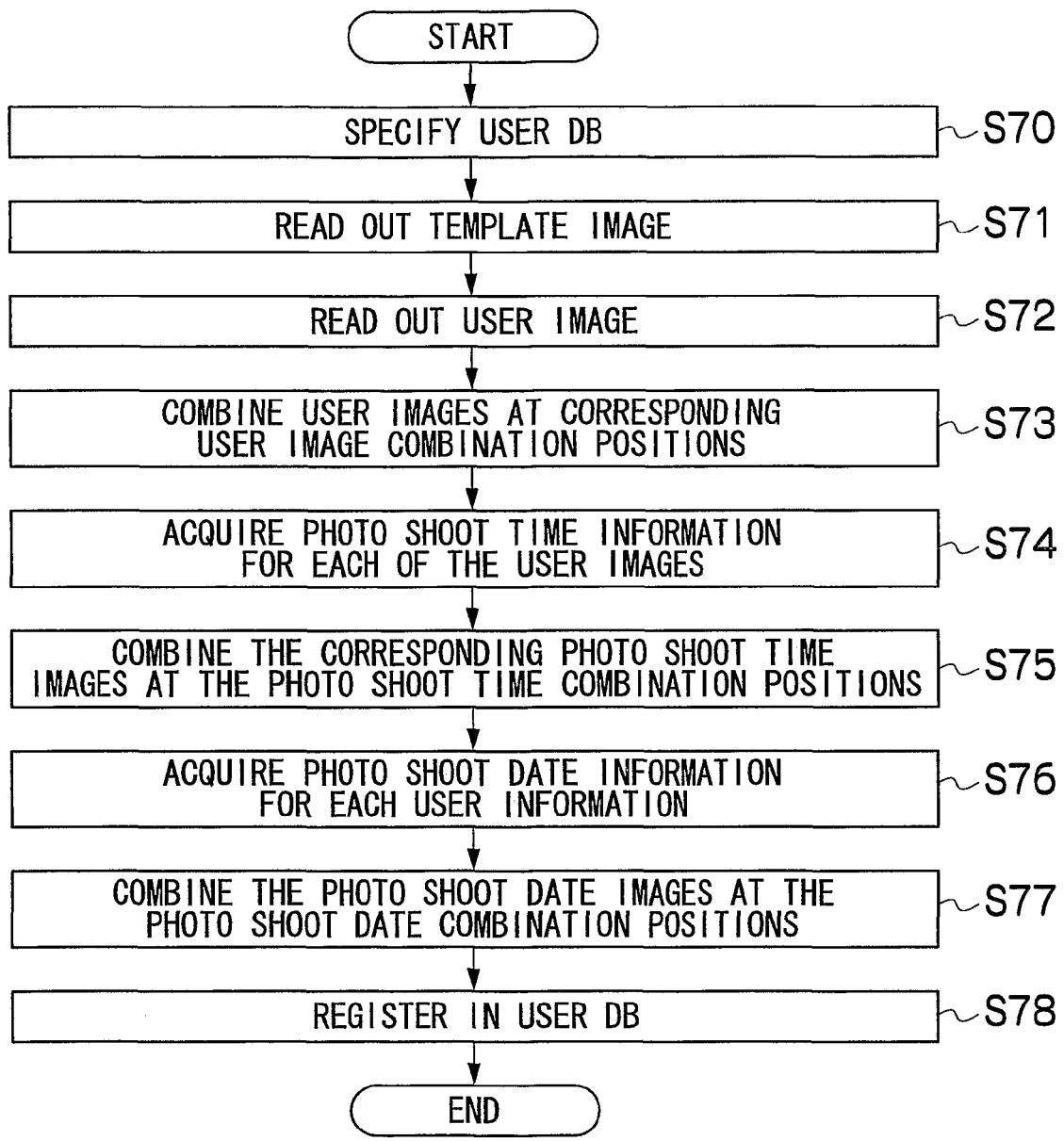

FIG.23

| | | | COMBINATION POSITION ||||
|---|---|---|---|---|---|---|
| | | | PHOTO NO.1 | PHOTO NO.2 | PHOTO NO.3 | PHOTO NO.4 |
| SEQUENCE OF EMAILS | 1ST MAIL | A | FIRST PICTURE RECEIVED! ||||
| | | T / T1 | GOOD MORNING! ||||
| | | T2 | HELLO! ||||
| | | T3 | GOOD EVENING! ||||
| | | B | ROBOZO HERE. I GOT A PICTURE FROM YOU! IT'S GREAT! ||||
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | THERE ARE STILL 3 TO GO! WE'VE ONLY JUST STARTED! YOU CAN ALSO GET TO THE "SEND PHOTO" PAGE VIA THIS LINK! http://fsmcm/darue/seou seu/fheour/io.ne.jp ||||
| | 2ND MAIL | A | SECOND PICTURE RECEIVED! ||||
| | | T / T1 | GOOD MORNING! ||||
| | | T2 | HELLO! ||||
| | | T3 | GOOD EVENING! ||||
| | | B | ROBOZO HERE. THAT'S A GREAT PHOTO TOO! ||||
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | STILL 2 TO GO! I'M WAITING! YOU CAN ALSO GET TO THE "SEND PHOTO" PAGE VIA THIS LINK! http://fsmcm/darue/seou seu/fheour/io.ne.jp ||||
| | 3RD MAIL | A | THIRD PICTURE RECEIVED! ||||
| | | T / T1 | GOOD MORNING! ||||
| | | T2 | HELLO! ||||
| | | T3 | GOOD EVENING! ||||
| | | B | ROBOZO HERE. I GOT YOUR PHOTO! ANOTHER GOOD ONE! ||||
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | JUST ONE TO GO! WE'VE NEARLY FINISHED! YOU CAN ALSO GET TO THE "SEND PHOTO" PAGE VIA THIS LINK! http://fsmcm/darue/seou seu/fheour/io.ne.jp ||||
| | 4TH MAIL | A | FOURTH PICTURE RECEIVED! ||||
| | | T / T1 | GOOD MORNING! ||||
| | | T2 | HELLO! ||||
| | | T3 | GOOD EVENING! ||||
| | | B | ROBOZO HERE. I GOT THE LAST PHOTO! RECEIVED SAFELY! ||||
| | | C | WHAT A COOL ROBOT! | YOU ARE VERY GOOD AT THIS! THIS WILL MAKE A FANTASTIC PRINT. | THAT'S A REALLY CHARMING PICTURE! | YOU ARE JUST AS GOOD-LOOKING AS THE ROBOTS! |
| | | D | THAT'S ALL THE PHOTOS WE NEED! I'LL GET ROBOTA TO MAKE A PRINT http://fsmcm/darue/seou seu/fheour/io.ne.jp ||||

FIG.24

RECEIVED : 12/25 SAT 10:00
From : Robozo.rally.jp
Sub: AAAAAAAAAAAAAAAAAAAA
---
TTTTTTTTTTTTTTTTTTTTT
BBBBBBBBBBBBBBBBBB
CCCCCCCCCCCCCCCCCC
CCCCCCCCCCCCCCCCCC
CCCCCCCCCCCCCCCCCC
CCCCCCCCCCCCCCCCCC
DDDDDDDDDDDDDDDDDD
DDDDDDDDDDDDDDDDDD
DDDDDDDDDDDDDDDDDD
DDDDDDDDDDDDDDDDDD http://fsmcm/darue/seou
seu/fheour/io.ne.jp (A) CHANGE ACCORDING TO ORDER OF RECEIVED MAIL (T) CHANGE ACCORDING TO TRANSMISSION TIME
(B) CHANGE ACCORDING TO ORDER OF RECEIVED MAIL (C) CHANGE ACCORDING TO RECEIVED MAIL ADDRESS (COMBINATION POSITION)

(D) CHANGE ACCORDING TO ORDER OF RECEIVED MAIL

COMPOSITE PHOTOGRAPH CREATION SYSTEM AND COMPOSITE PHOTOGRAPH CREATION APPARATUS

BACKGROUND OF THE INVENTION

1. Technical Field

The present invention relates to a composite photograph creation system and composite photograph creation apparatus, and more particularly, to a composite photograph creation system and composite photograph creation apparatus that create a composite photograph in which a user image captured by a user is pasted at a prescribed position of a template image.

2. Background Art

Digital cameras that electrically record images have a benefit in that they allow the shot image to be processed readily, with respect to silver halide-based film cameras. In order to create a composite photograph in which an image captured by a digital camera is combined with a prescribed template, various types of services have been proposed which make use of this benefit of easy processability.

For example, Japanese Patent Application Publication No. 2000-168187 discloses a system for creating one original image by selecting a plurality of desired images from amongst images captured by a digital camera, and pasting this selected plurality of images onto a prescribed template. Furthermore, Japanese Patent Application Publication Nos. 2000-22929 and 2004-178163 disclose methods whereby a decorative frame is combined with a portrait image to create a composite image that is then printed. Japanese Patent Application Publication No. 10-210340 discloses a method whereby a portion relating to a person is extracted from an image, and that extracted image is combined with a different background, such as a computer graphics image, a landscape image, or the like.

However, those composite photograph creation systems require knowledge of image synthesis and are complicated and troublesome to operate. Therefore, it is difficult that those systems are used freely and easily by users.

DISCLOSURE OF THE INVENTION

The present invention was devised in view of the foregoing circumstances, an object thereof being to provide a composite photograph creation system and a composite photograph creation apparatus whereby composite photographs can be created in a simple manner.

In order to attain the aforementioned object, the present invention is directed to a composite photograph creation system which creates a composite photograph by pasting a user image at a previously determined user image combination position on a template image, the system comprising: a user terminal which sends the user image to one of transmission destinations independently assigned to a plurality of template images; a reception device which receives the user image sent to the one of transmission destinations; and a composite photograph creation device which creates the composite photograph by pasting the user image received by the reception device, at the user image combination position on one of the template images, in accordance with the transmission destination of the user image.

According to this aspect of the invention, a transmission destination related to user image is set for each one of a plurality of template images. The user sends a user image to a transmission destination specified for each template image. The sent user image is received by the reception device, and is pasted to a prescribed user image combination position on the template image, in accordance with the transmission destination of the user image.

Preferably, each of the template images has a plurality of user image combination positions; a combination rule is assigned to each of the user image combination positions; and the composite photograph creation device creates the composite photograph by pasting the user image received by the reception device, at one of the user image combination positions, in accordance with the combination rule.

According to this aspect, a plurality of user image combination positions are set on the template image and a combination rule is set for each user image combination position. If a plurality of user images (for a plurality of user image combination positions) are sent from the user terminal to prescribed transmission destinations, then the user images are pasted to the user image combination positions in accordance with the combination rules.

The present invention is also directed to a composite photograph creation system which creates a composite photograph by pasting a user image at a previously determined user image combination position on a template image, the system comprising: a user terminal which sends the user image to one of transmission destinations assigned to user image combination positions on the template image; a reception device which receives the user image sent to the one of the transmission destinations; and a composite photograph creation device which creates the composite photograph by pasting the user image received by the reception device, at one of the user image combination positions on the template image, in accordance with the transmission destination of the user image.

According to this aspect of the invention, a user image transmission destination is set for each combination position on the template image. The user sends a user image to a transmission destination specified for each template image. The sent user image is received by the reception device, and is pasted to a prescribed user image combination position on the template image, in accordance with the transmission destination of the user image.

The present invention is also directed to a composite photograph creation system which creates a composite photograph by pasting a user image at a previously determined user image combination position on a template image, the system comprising: a user terminal which sends an electronic mail to which a user image is attached, to a prescribed mail address; a reception device which receives the electronic mail sent to the prescribed mail address; and a composite photograph creation device which creates the composite photograph by pasting the user image attached to the electronic mail received by the reception device, at the user image combination position on the template image.

According to this aspect, if an electronic mail to which a user image is attached is sent from the user terminal to a prescribed mail address, then it is received by the reception device. A composite photograph is created by pasting the user image attached to the electronic mail to a user image combination position on the template image, by the composite photograph creation device.

Preferably, the template image has a plurality of user image combination positions; a destination mail address is assigned to each of the user image combination positions; and the composite photograph creation device creates the composite photograph by pasting the user image attached to the electronic mail received by the reception device, at one of the user image combination positions, in accordance with a destination mail address of the received electronic mail.

According to this aspect, a plurality of user image combination positions are set on a template image, and mail addresses are set respectively for user image combination positions. If an electronic mail to which an image is attached is sent to one of the mail addresses from the user terminal, the user image attached to the electronic mail is pasted to a user image combination position in accordance with the destination mail address of the electronic mail.

Preferably, the template image has a plurality of user image combination positions; a combination rule is assigned to each of the user image combination positions; and the composite photograph creation device creates the composite photograph by pasting the user image attached to the electronic mail received by the reception device, at one of the user image combination positions, in accordance with the combination rule.

According to this aspect, a plurality of user image combination positions are set on the template image and a combination rule is set for each user image combination position. If a plurality (for instance, a number corresponding to the number of user image combination positions) of electronic mails having attached images are sent from the user terminal to prescribed mail addresses, then the user images attached to the electronic mails are pasted at the user image combinations positions, in accordance with the established combination rules.

Preferably, the composite photograph creation system further comprises a reply device which sends back an electronic mail stating a prescribed message in a mail text, to a source mail address of the electronic mail sent to the prescribed mail address, when the electronic mail sent to the prescribed mail address is received by the reception device.

According to this aspect, when an electronic mail sent to a prescribed mail address is received by the reception device, the reply device sends back an electronic mail having a prescribed message in the mail text, to the sender's mail address.

Preferably, the composite photograph creation system further comprises a content image creation device which creates a content image to be pasted to a content image combination position set on the template image, in accordance with contents of the electronic mail received by the reception device, wherein the composite photograph creation device creates the composite photograph by pasting the user image attached to the electronic mail received by the reception device, at the user image combination position, and also pasting the content image created by the content image creation device, at the content image combination position.

According to this aspect, a user image combination position and a content image combination position are established on the template image. If an electronic mail is received by the reception device, a content image to be pasted on the content image combination position is created by the content image creation device according to the contents of the electronic mail. The composite photograph creation device creates a composite photograph by pasting the user image attached to the electronic mail, at the user image combination position, and by also pasting the content image created by the content image creation device, at the content image combination position.

Preferably, the composite photograph creation system further comprises a print device which prints the composite photograph created by the composite photograph creation device, on printing paper.

According to this aspect, it is possible to print a composite photograph created by the composite photograph creation device, onto print paper, by means of the print device.

The present invention is also directed to a composite photograph creation apparatus which creates a composite photograph by pasting a user image at a previously determined user image combination position on a template image, the apparatus comprising: a reception device which receives the user image sent to one of transmission destinations independently assigned to a plurality of template images; a composite photograph creation device which creates the composite photograph by pasting the user image received by the reception device, at the user image combination position on one of the template images, in accordance with the transmission destination of the user image.

According to this aspect of the invention, a user image transmission destination is set for each of a plurality of template images. The user sends a user image to a transmission destination specified for each template image. The sent user image is received by the reception device, and is pasted to a prescribed user image combination position on one of the template images, in accordance with the transmission destination.

Preferably, each of the template images has a plurality of user image combination positions; a combination rule is assigned to each of the user image combination positions; and the composite photograph creation device creates the composite photograph by pasting the user image received by the reception device, at one of the user image combination positions, in accordance with the combination rule.

According to this aspect, a plurality of user image combination positions are set on the template image and a combination rule is set for each user image combination position. If a plurality of user images (for instance, a number corresponding to the user image combination positions) are sent from the user terminal to prescribed transmission destinations, then the user images are pasted to the user image combination positions in accordance with the established combination rules.

The present invention is also directed to a composite photograph creation apparatus which creates a composite photograph by pasting a user image at a previously determined user image combination position on a template image, the apparatus comprising: a reception device which receives the user image sent to one of transmission destinations assigned to the user image combination positions on the template image; and a composite photograph creation device which creates the composite photograph by pasting the user image received by the reception device, at one of the user image combination positions on the template image, in accordance with the transmission destination of the user image.

According to this aspect of the invention, a user image transmission destination is set for each combination position on the template image. The user sends a user image to a transmission destination specified for each template image. The sent user image is received by the reception device, and is pasted to a user image combination position on the template image, in accordance with the transmission destination.

The present invention is also directed to a composite photograph creation apparatus which creates a composite photograph by pasting a user image at a previously determined user image combination position on a template image; the apparatus comprising: a reception device which receives an electronic mail sent to a prescribed mail address; and a composite photograph creation device which creates the composite photograph by pasting the user image attached to the electronic mail received by the reception device, at the user image combination position on the template image.

According to this aspect of the invention, if the reception device receives an electronic mail with an attached user image that has been sent to a prescribed mail address, then the composite photograph creation device pastes the user image attached to the electronic mail, to a user image combination position of the template image, thereby creating a composite photograph.

Preferably, the template image has a plurality of user image combination positions; a mail address is assigned to each of the user image combination positions; and the composite photograph creation device creates the composite photograph by pasting the user image attached to the electronic mail received by the reception device, at one of the user image combination positions, in accordance with a mail address of the received electronic mail.

According to this aspect, a plurality of user image combination positions are set on the template image, and a mail address is set for each user image combination position. If an electronic mail to which an image is attached is sent to one of the mail addresses, the user image attached to the electronic mail is pasted to a user image combination position in accordance with the destination mail address of the electronic mail.

Preferably, the template image has a plurality of user image combination positions; a combination rule is assigned to each of the user image combination positions; and the composite photograph creation device creates the composite photograph by pasting the user image attached to the electronic mail received by the reception device, at one of the user image combination positions, in accordance with the combination rule.

According to this aspect, a plurality of user image combination positions are set on the template image and a combination rule is set for each user image combination position. If a plurality (for instance, a number corresponding to the number of user image combination positions) of electronic mails having attached images are sent from the user terminal to prescribed mail addresses, then the user images attached to the electronic mails are pasted at the user image combinations positions, in accordance with the established combination rules.

Preferably, the composite photograph creation apparatus further comprises a reply device which sends back an electronic mail stating a prescribed message in a mail text, to a source mail address of the electronic mail sent to the prescribed mail address, when the electronic mail sent to the prescribed mail address is received by the reception device.

According to this aspect, when an electronic mail sent to a prescribed mail address is received by the reception device of the composite photograph creation device, an electronic mail having a prescribed message in the mail text is sent back to the sender's mail address.

Preferably, a content image combination position is set on the template image; the composite photograph creation apparatus further comprises a content image creation device which creates a content image to be pasted at the content image combination position, in accordance with contents of the electronic mail received by the reception device; and the composite photograph creation device creates the composite photograph by pasting the user image attached to the electronic mail received by the reception device, at the user image combination position, and pasting the content image created by the content image creation device, at the content image combination position.

According to this aspect, a user image combination position and a content image combination position are established on the template image. If an electronic mail is received by the reception device of the composite photograph creation device, a content image for pasting to the content image combination position is created by the content image creation device. The composite photograph creation device creates a composite photograph by pasting the user image attached to electronic mail, at the user image combination position, and by also pasting the content image created by the content image creation device, at the content image combination position.

Preferably, the composite photograph creation apparatus, further comprises a print device which prints the composite photograph created by the composite photograph creation device, on printing paper.

According to this aspect, it is possible to print a composite photograph created by the composite photograph creation device, onto print paper, by means of the print device.

According to the composite photograph creation system and composite photograph creation device on the basis of the present invention, it is possible to create a composite photograph in a simple fashion.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 2 is a flowchart showing the sequence of the processing performed by a user until the start of the service, and the corresponding operational processing performed by the system server;

FIGS. 3A, 3B, and 3C are monitor display examples of a camera-equipped mobile telephone that has accessed a web page;

FIG. 4 is an illustrative diagram of a user DB;

FIGS. 5A, 5B, 5C and 5D are monitor display examples of a camera-equipped mobile telephone which has accessed a web page;

FIG. 6 is a flowchart showing the sequence of the processing performed by a user from the start of the service until creation of a composite photograph, and the corresponding operational processing performed by the system server;

FIG. 11 is an illustrative diagram of a destination address DB;

FIG. 13 is an illustrative diagram of a reply mail DB;

FIGS. 16A and 16B are monitor display examples of a camera-equipped mobile telephone which has accessed a web page;

FIGS. 17A and 17B are monitor display examples of a camera-equipped mobile telephone which has accessed a web page;

FIG. 19 is a flowchart showing the procedure of composite photograph creation processing;

FIG. 23 is an illustrative diagram of a further example of a reply mail DB; and

FIG. 24 is an illustrative diagram of a further example of a reply mail DB.

BEST MODE FOR CARRYING OUT THE INVENTION

Figure 1:
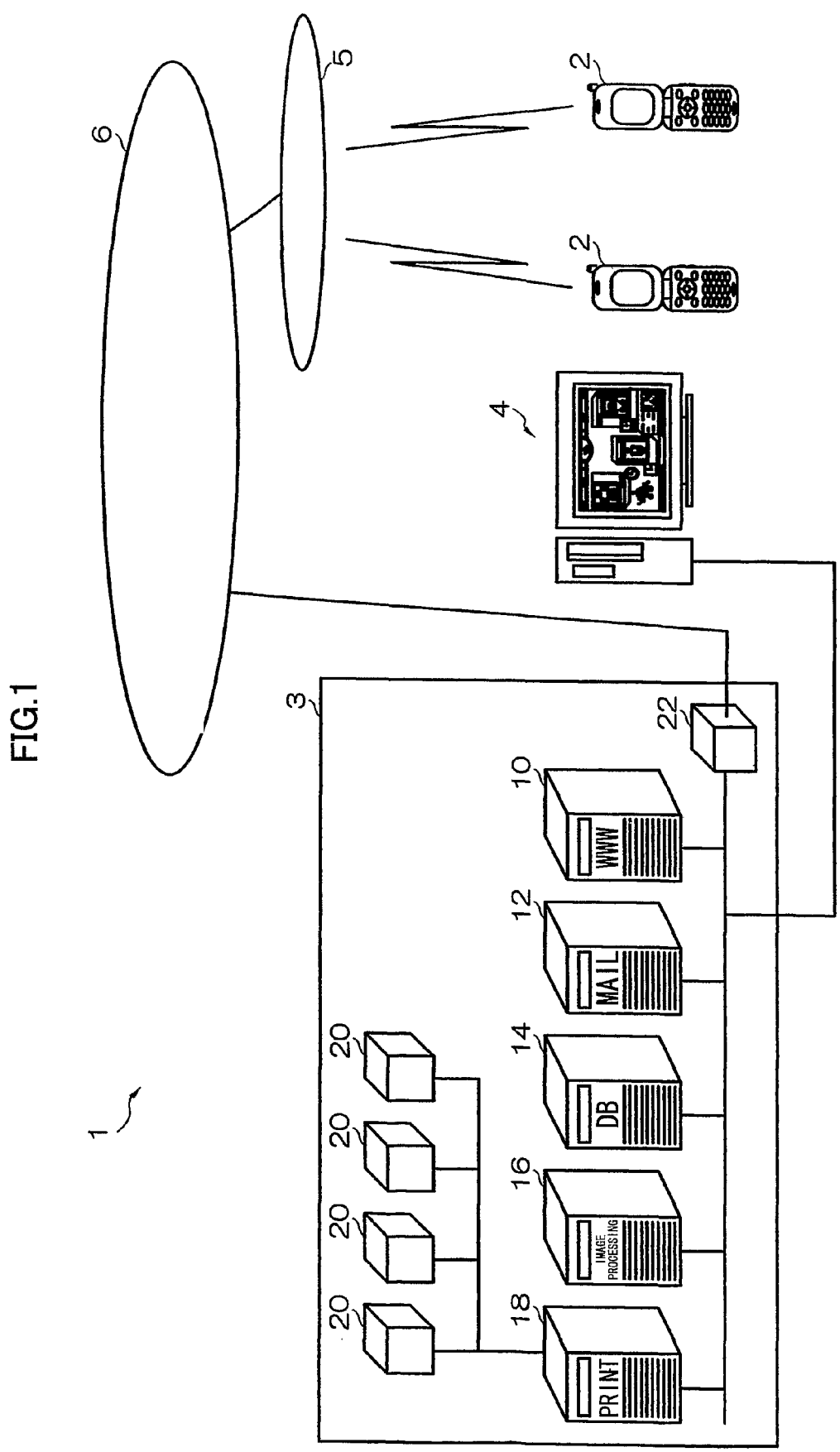
FIG. 1 is a schematic system diagram showing the composition of one embodiment of a composite photograph creation system according to the present invention.

FIG. 1 is a schematic system diagram showing the composition of one embodiment of a composite photograph creation system according to the present invention.

As shown in FIG. 1, the composite photograph creation system 1 according to the present embodiment may be used as a system for providing a composite photograph creation service (under the name of "Mobile Snapshot Rally"), located usually in a particular facility, such as an amusement park or theme park. By using the composite photograph creation service, an image taken by a user on his or her camera-equipped mobile telephone 2 can be combined with a prescribed template. The user photographs an exhibit, or the like, in the facility in accordance with a certain theme, using his or her camera-equipped mobile telephone 2, and then attaches the shot image to an electronic mail, and sends the electronic mail to a prescribed mail address. The system server 3 receives the electronic mail sent to the mail address, and creates a composite photograph by pasting the image (user image) attached to the received electronic mail, onto a prescribed template. The composite photograph thus created is displayed on the display monitor of an image display terminal 4 situated in the facility, and it is printed onto printing paper in accordance with a print order from the user.

The user implements a series of processes from the capturing of the image for a composite photograph, to the ordering of a print, in accordance with instructions in the electronic mails transmitted successively from the system server 3. More specifically, when the service provided by this system is started, electronic mails stating the details of the processing to be performed by the user are successively sent from the system server 3 to the user's camera-equipped mobile telephone 2. The user carries out actions in accordance with the instructions stated in the text body of the electronic mails sent by the system server 3, to execute processing for creating a prescribed composite photograph.

In this case, the contents stated in the text body of the electronic mail sent from the system server 3 successively change depending on the actions performed by the user, and hence there are interactive communications between the user and the system server 3.

The camera-equipped mobile telephone 2 used by the user is constituted by a normal mobile telephone having camera functions, electronic mail functions, and WWW browsing functions. The camera-equipped mobile telephone 2 can connect to the Internet 6 via a mobile communications network 5.

As shown in FIG. 1, the system server 3 includes a WWW (WorldWideWeb) server 10, a mail server 12, a database (DB) server 14, an image processing server 16, a print server 18, and the like. The respective servers are connected in a mutually communicable fashion via a LAN (Local Area Network), and are connected to the Internet 6 by means of a router 22.

The WWW server 10 includes a normal computer that runs software for providing WWW services, and provides the WWW services described below to the user of the present system.

The mail server 12 includes a normal computer that runs software for providing mail services, and provides electronic mail transmission and reception services to the user of the present system.

The database server 14 includes a normal computer which runs software for holding and managing a database (DB), and it holds and manages the prescribed databases described hereinafter (user DB, mail DB, return mail DB, destination address DB, template DB, contents DB).

The image processing server 16 includes a normal computer that runs software for carrying out prescribed image processes, and it creates a composite photograph by executing image combination processing as described hereinafter.

The print server 18 controls the respective printers 20 connected to same, and thus controls the printing of composite photograph images created by the image processing server 16.

The respective servers constituting the system server 3 operate in a mutually cooperative fashion, thereby providing a composite photograph creation service to the user.

The image display terminal 4 includes a normal computer that runs a prescribed image display program, and contains a monitor and a user interface such as a mouse and a keyboard. The image display terminal 4 is connected to the system server 3 via a LAN, and the system server 3 displays a prescribed composite photograph image on the monitor, in accordance with a request from the image display terminal 4.

Concerning the composite photograph creation service provided by the system server 3 of the composite photograph creation system 1 having the composition described above according to the present embodiment, the processing from the start of the service to the creation of a print will now be described step by step.

The following description relates to an example in which the composite photograph creation system 1 according to the present embodiment is used in a prescribed exhibition hall. In this exhibition, entrance tickets bearing unique ID numbers are issued, and each user enters into the exhibition hall by purchasing an entrance ticket of this kind.

FIG. 2 is a flowchart showing the sequence of the processing performed by a user until the start of the service, and the corresponding operational processing performed by the system server 3.

Prior to the start of the service, the user performs user registration, following a prescribed procedure. Firstly, the user accesses the homepage provided by the WWW server 10, by using a browsing function of his or her camera-equipped mobile telephone 2 (step S10).

FIG. 3A shows a monitor display example of the camera-equipped mobile telephone 2 when the camera-equipped mobile telephone 2 has accessed the homepage provided by the WWW server 10. As shown in FIG. 3A, an overview of the service provided by the present system is described on the monitor screen. When using the service, the user operates the camera-equipped mobile telephone 2 and clicks on the button "# Start Here". Upon clicking this button, the linked web page, which is a web page that describes the user registration procedure, is displayed on the monitor of the user's camera-equipped mobile telephone 2.

FIG. 3B shows a monitor display example of the camera-equipped mobile telephone 2 when the camera-equipped mobile telephone 2 has accessed the web page describing the procedure for user registration. As shown in FIG. 3B, a description of the user registration procedure is shown on the monitor. The user operates the camera-equipped mobile telephone 2 in accordance with the display. More specifically, firstly, the user clicks on the "# Send mail" button shown on the monitor. Upon clicking this button, the mail software is started up in the camera-equipped mobile telephone 2 and an electronic mail is displayed on the monitor, the destination address of the electronic mail being set to a stipulated mail address. The user sends the electronic mail as it is, without changing the destination address and without entering any text in the body of the electronic mail displayed on the monitor (Step S11). In other words, the user sends a blank electronic mail.

The electronic mail (blank mail) thus sent is received by the mail server 12 (step S12). In the DB server 14, the mail address of the user is registered in the user DB on the basis of the electronic mail received by the mail server 12 (step S13).

As shown in FIG. 4, the user DB is created by mutually associating items such as the user's entrance ticket ID, user's gender, user's age group, option, user images (Photo No. 1 to Photo No. 3, and face image), and composite photographs. This information is stored in a prescribed storage region of the DB server 14. The mail address of the electronic mail (blank mail) sent by the user's camera-equipped mobile telephone 2 is registered in the "mail address" column, as described above. The ID number appended to the entrance ticket held by the user is registered in the "entrance ticket ID" column, as described hereinafter. The user's gender and age group, which are input via a user registration screen described hereinafter, are registered in the "gender" and "age group" columns. The number appended to an option selected from an option selection screen described hereinafter is registered in the "option" column. Image data (user images) attached to electronic mails sent by the user's camera-equipped mobile telephone 2, as described hereinafter, are registered respectively in the "user image (Photo No. 1 to Photo No. 3, and face image)" columns, in association with a destination address (combination position). Image data for a created composite photograph is registered in the "composite photograph image" column.

When a blank mail is received in the mail server 12, the DB server 14 registers the mail address in the user DB, on the basis of the sender's mail address of the blank mail (in other words, the user's mail address) (step S13).

When the registration of the user's mail address has been completed, the mail server 12 sends an electronic mail for user registration (an electronic mail giving guidance on user registration), to the sender's mail address, in other words, the mail address of the user who sent the blank mail (step S14). The user receives the electronic mail sent from the mail server 12, on his or her camera-equipped mobile telephone 2 (step S15).

FIG. 3C shows a display example of the monitor of the user's camera-equipped mobile telephone 2 when the electronic mail for user registration has been opened. As shown in FIG. 3C, the body of the electronic mail for user registration contains a URL (Uniform Resource Locator) for a web page for performing user registration. By clicking on this URL, the browser is started up, the camera-equipped mobile telephone 2 accesses the web page having the URL (the user registration web page) (step S16), and this web page is displayed on the monitor.

The URL given in the electronic mail for user registration is set independently for each respective user, in such a manner that the accessing user can be identified.

FIG. 5A shows a display example of the monitor of the camera-equipped mobile telephone 2 when the user has accessed the user registration web page. As shown in FIG. 5A, the user registration web page shows input columns corresponding to the entrance ticket ID, and the user's gender and age group. The user inputs the required information in the input columns, by operating the camera-equipped mobile-telephone-2 in accordance with the display on the monitor (step S17). When the user clicks on the "Next" button after inputting the required information, the input information is sent to the WWW server 10.

On the other hand, when the "Next" button is clicked, the camera-equipped mobile telephone 2 accesses the linked web page corresponding to the option selection. FIG. 5B shows an example of a monitor display of the web page corresponding to the option selection. As shown in FIG. 5B, in the composite photograph creation system 1 according to the present embodiment, it is possible to select three options. The three options in the present embodiment are: (1) an option for creating a composite photograph by sending three images of robots taken in the exhibition hall and an image of the user's face, by electronic mail ("Snap Robots!"), (2) an option for creating a composite photograph by sending any three images taken in the exhibition hall and an image of the user's face, by electronic mail ("My top three favorites!"), and (3) an option for creating a composite photograph by sending three amusing images taken in the exhibition hall and an image of the user's face, by electronic mail ("Totally hilarious! Have a good laugh!"). The user selects an option to use by operating the camera-equipped mobile telephone 2 in accordance with the display on the monitor (step S18). More specifically, the user clicks on the button of the option that he or she is to use. When the button of the option to be used has been clicked, information relating to the selected option is sent to the WWW server 10.

When the button for the option to be used has been clicked, the user's camera-equipped mobile telephone 2 accesses the linked web page corresponding to the option description. FIG. 5C shows an example of a monitor display of a web page corresponding to the option description. As shown in FIG. 5C, a description of the selected option (in this case, the "Snap Robots!" option) is shown. The user confirms the display on the monitor, and then in order to start the service, he or she clicks the "Take part" button displayed on the web page. When the user has clicked the "Take part" button, instructions on a service start are sent to the WWW server 10 (step S19).

When the instructions on the service start has been sent to the WWW server 10 and the WWW has received the instructions, the DB server 14 registers the information received by the WWW server 10 (entrance ticket ID, gender, age group, option) in the user DB of the corresponding mail address (step S20), and then starts to provide a composite photograph creation service (step S21).

Furthermore, when the user clicks the "Take part" button, the user's camera-equipped mobile telephone 2 accesses the linked web page corresponding to the service start. FIG. 5D shows a monitor display example of the web page corresponding to the service start. As shown in FIG. 5D, a message indicating the start of a service, and a simple description relating to the service is displayed on the web page. The user checks the web page and recognizes that the service has started.

By means of the aforementioned sequence of steps, the user registration process is completed and a composite photograph creation service for the selected option is started.

Next, the processing from the start of the service until the creation of a composite photograph will be described in accordance with the flowchart shown in FIG. 6. The following description relates to a case where the "Snap Robots!" option has been selected as the option to use.

FIG. 6 is a flowchart showing the processing performed by the user from the start of the service until the creation of the composite photograph, and the corresponding operational processing performed by the system server 3.

When the service starts, the mail server 12 sends an initial instruction by electronic mail (step S30). The user receives the electronic mail sent by the mail server 12 on his or her own camera-equipped mobile telephone 2 (step S31).

Figure 7A:
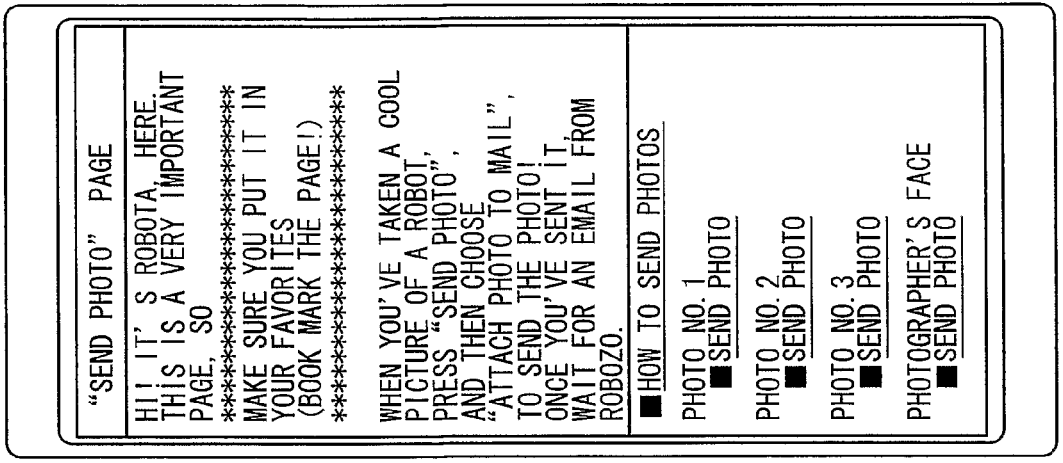
FIGS. 7A and 7B are monitor display examples of a camera-equipped mobile telephone which has accessed a web page.

FIG. 7A shows a display example of the monitor of the user's camera-equipped mobile telephone 2 when the initial instruction electronic mail sent by the mail server 12 has been opened. As shown in FIG. 7A, the body of the electronic mail gives guidance on how to use the option selected by the user, and it also shows the URL of the web page for sending an image (photograph). In the case of the present embodiment, the "Snap Robots!" option has been selected, and therefore, guidance indicating that the user is to take photographs of three robots and a photograph of the user's face and to send in these shot images, is stated in the body of the electronic mail. In this case, in order to create a sense of affinity with the user, desirably, the contents of the text of the electronic mail are represented as if they are being told by a virtual sender. For example, if there is a mascot character in the exhibition hall, then desirably, the text contents of the electronic mail are represented as if that mascot character were talking to the user.

Since the use method varies depending on the option, the contents stated in the text of the electronic mail are changed according to the selected option. These text contents of the electronic mail are recorded as a mail DB in the DB server 14. The mail server 12 reads out the text contents corresponding to the option selected by the user, from the mail DB, and sends it to the user.

The user photographs a first robot image in accordance with this first electronic mail (step S32). After photographing the image, the user clicks on the web page having the URL stated in the text of the first electronic mail, and thereby accesses the web page (step S33).

Figure 7B:
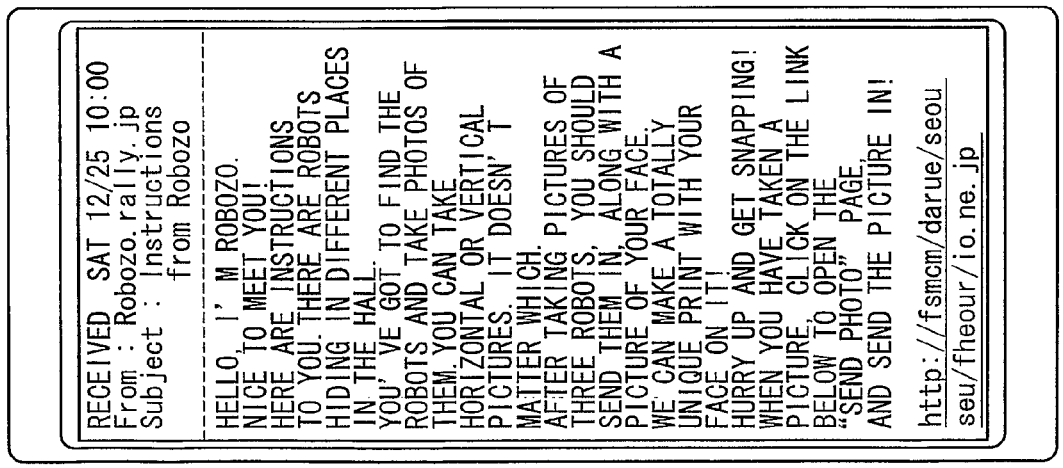

FIG. 7B shows an example of a monitor display of a web page for sending images. As shown in FIG. 7B, this web page shows a greeting text and advice information, as well as "# Send photo" buttons for sending an image. Each button for sending an image is prepared for each combination position, and the user clicks the button of a desired combination position.

Figure 8:
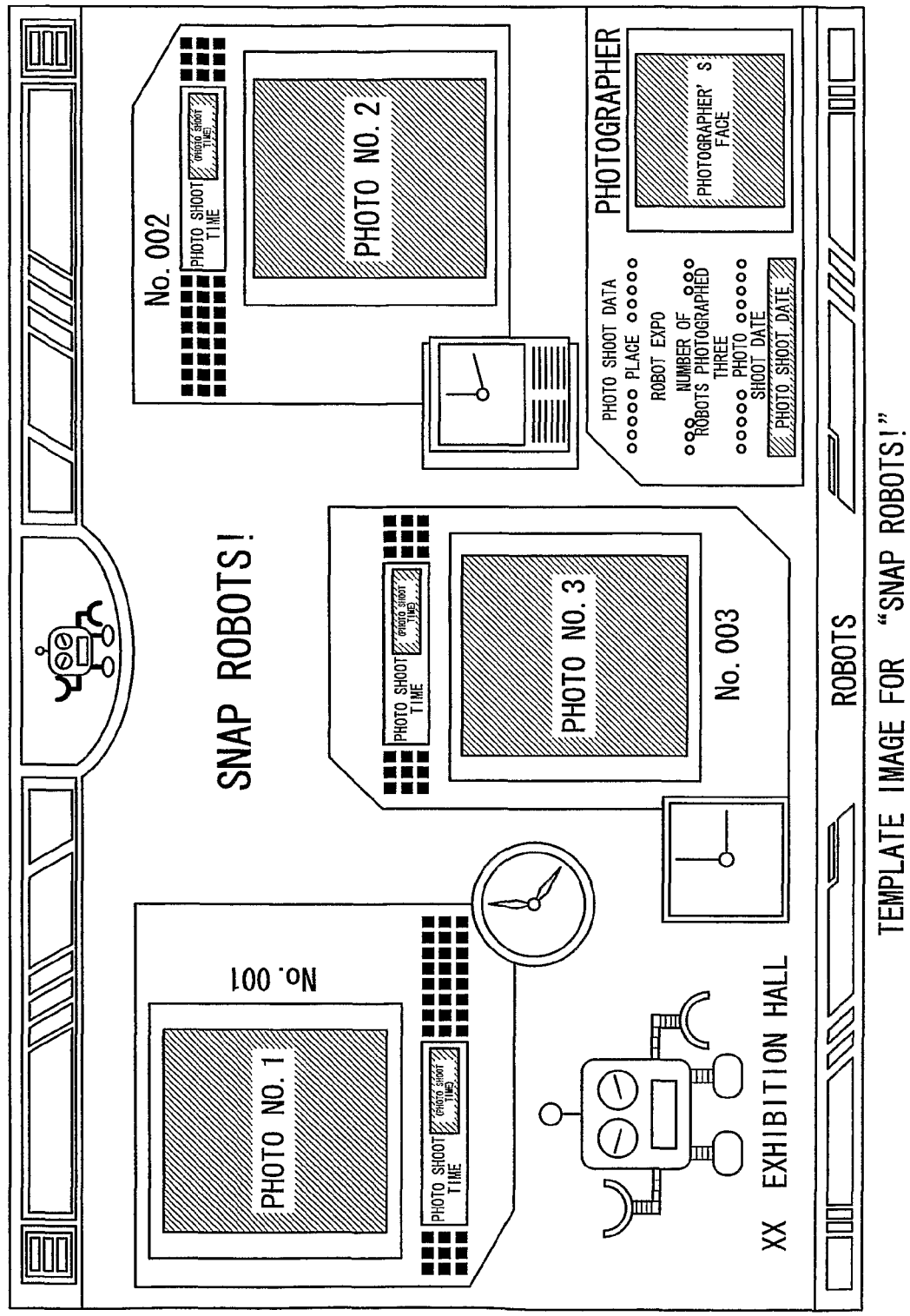
FIG. 8 is a diagram showing one example of a template image for "Snap Robots!"
Figure 9:
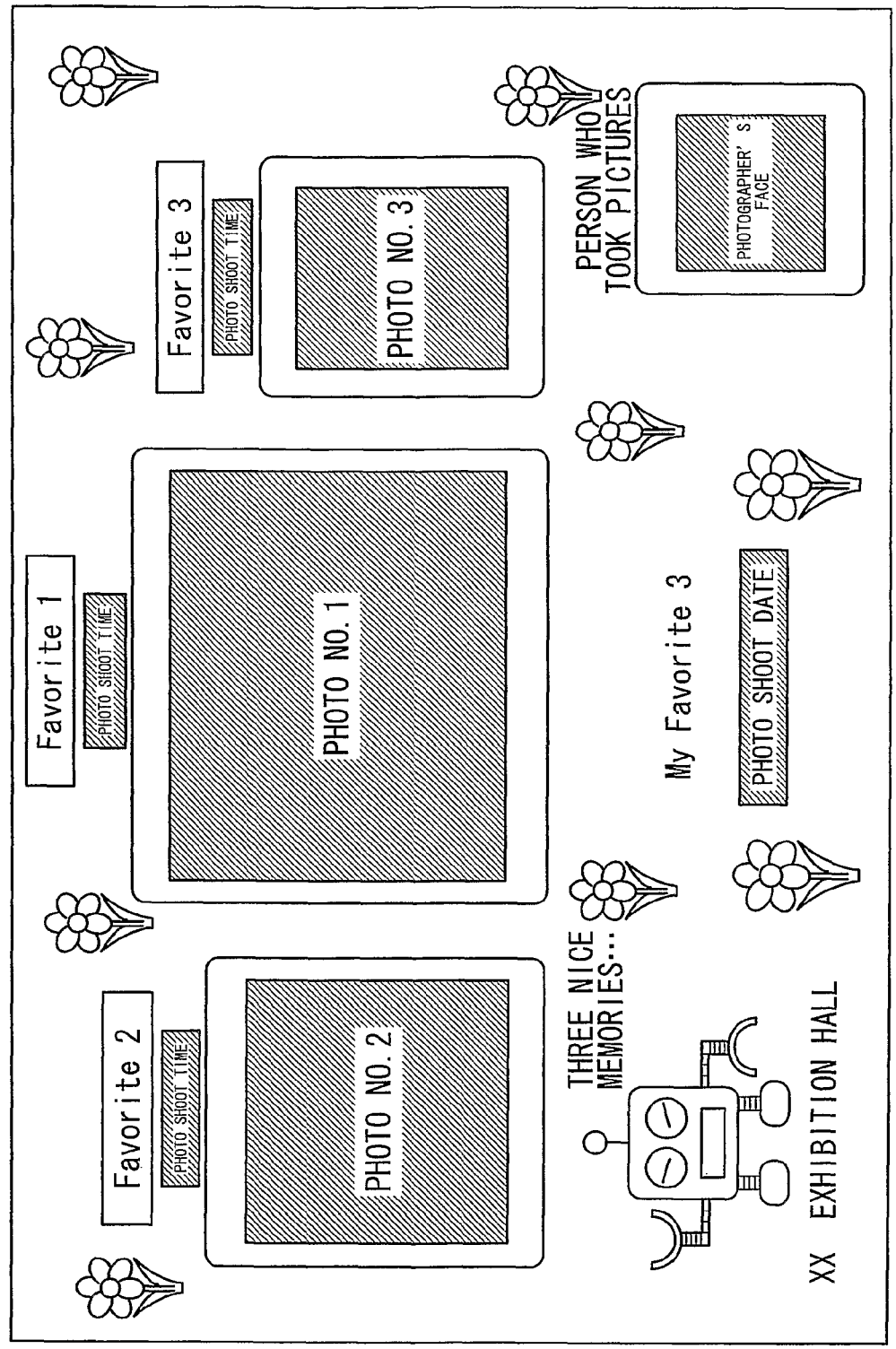
FIG. 9 is a diagram showing one example of a template image for "My top three favorites"
Figure 10:
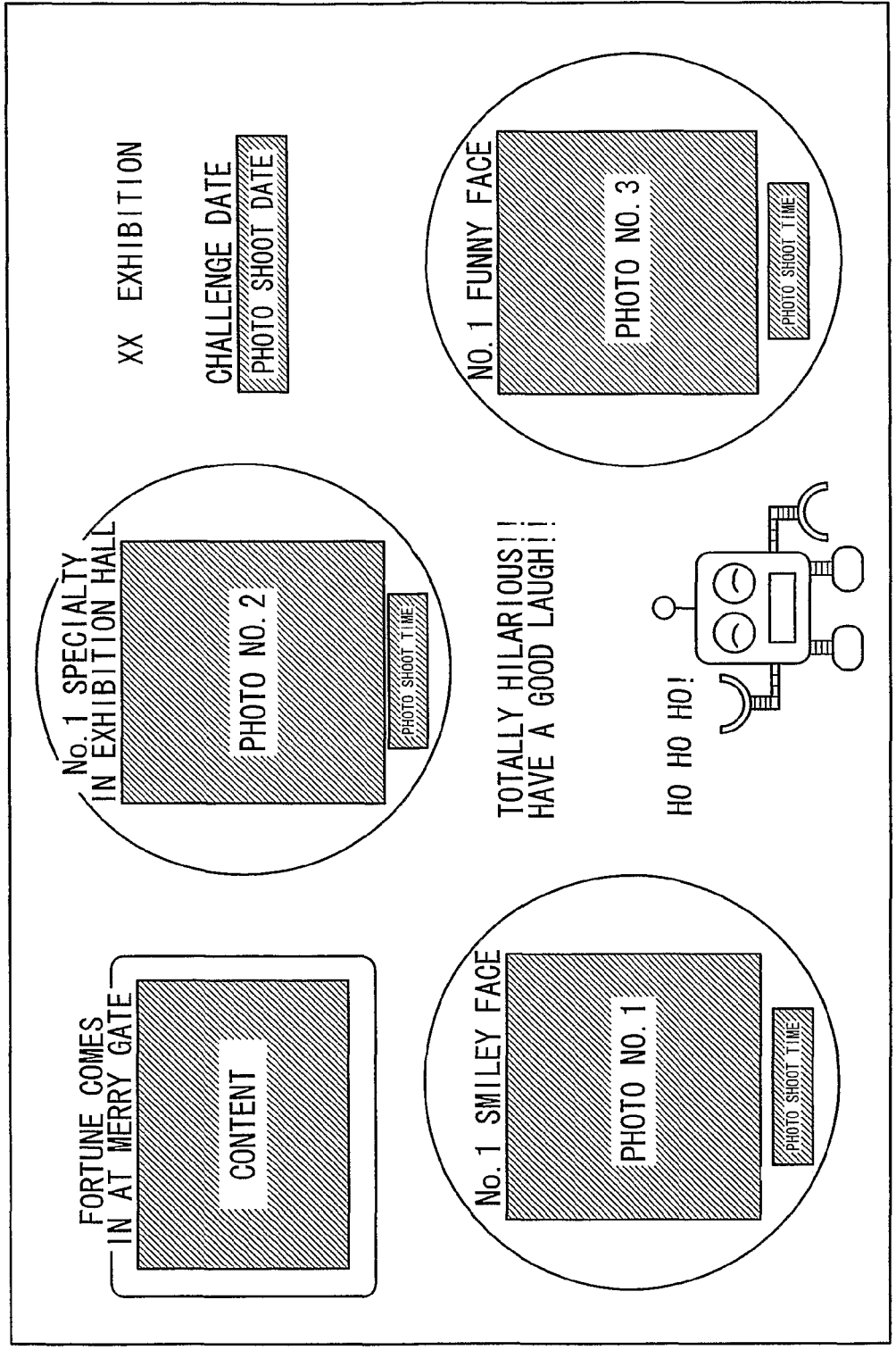
FIG. 10 is a diagram showing one example of a template image for "Totally hilarious!! Have a good laugh!!"

The term "combination position" here is the position set on the template image at which the image captured by the user (user image) is to be attached, and these combination positions are established in advance with respect to each of the template images used. The template image used is set independently for each option selected by the user. More specifically, as shown in FIGS. 8 to 10, corresponding template images are prepared respectively for the options, and the template image to be used is determined automatically when the user selects an option. This template image is associated with the corresponding option as the template DB, and is stored in the DB server 14.

For example, FIG. 8 shows a template image for the "Snap Robots!" option, and here, the obliquely shaded regions are set as the combination positions. An image sent as Photo No. 1 is combined at the Photo No. 1 combination position. An image sent as Photo No. 2 is combined at the Photo No. 2 combination position. An image sent as Photo No. 3 is combined at the Photo No. 3 combination position. An image sent as the face of the photographer is combined at the photographer's face combination position. Information indicating the photo shoot times of the images combined at the Photo Nos. 1 to 3 combination positions are combined at photo shoot time combination positions provided respectively in the vicinity of the Photo Nos. 1 to 3 combination positions. Information indicating the photo shoot date is combined at a photo shoot date combination position provided in the vicinity of the photographer's face combination position.

Furthermore, FIG. 9 shows a template image for the "My top three favorites" option, and here, the obliquely shaded regions are set as the combination positions. An image sent as Photo No. 1 is combined at the Photo No. 1 combination position. An image sent as Photo No. 2 is combined at the Photo No. 2 combination position. An image sent as Photo No. 3 is combined at the Photo No. 3 combination position. An image sent as the face of the photographer is combined at the photographer's face combination position. The photo shoot times of the images combined at the Photo Nos. 1 to 3 combination positions are combined at photo shoot time combination positions provided respectively in the vicinity of the Photo Nos. 1 to 3 combination positions. The photo shoot date is combined at a photo shoot date combination position set in the center of the screen.

Furthermore, FIG. 10 shows a template image for the "Totally hilarious! Have a good laugh!" option, in which the oblique shaded regions are set as the combination positions. An image sent as Photo No. 1 is combined at the Photo No. 1 combination position. An image sent as Photo No. 2 is combined at the Photo No. 2 combination position. An image sent as Photo No. 3 is combined at the Photo No. 3 combination position. Prescribed content information is combined at a content combination position. The photo shoot times of the images combined at the Photo Nos. 1 to 3 combination positions are combined at photo shoot time combination positions provided respectively in the vicinity of the Photo Nos. 1 to 3 combination positions. The photo shoot date is combined at a photo shoot date combination position set in the top right-hand part of the screen.

When sending an image, the user clicks on the web page having the URL stated in the body text of the electronic mail received from the mail server 12, and thereby accesses the web page for sending images. The user then clicks on a desired combination position button, of the four buttons "# Send photo" for sending images displayed on that web page.

When the user's camera-equipped mobile telephone 2 accesses the web page for sending an image, then this access information is recorded in the user's camera-equipped mobile telephone 2. This information is sent to the WWW server 10 when the user accesses that web page again. The WWW server 10 identifies the user by referring to the information sent from the user's camera-equipped mobile telephone 2.

When the user selects and clicks on a desired combination position button, the mail software in the camera-equipped mobile telephone 2 is started up, and an electronic mail addressed to the designated mail address is displayed on the monitor. The user attaches a photographed image to the electronic mail displayed on the monitor, and sends the electronic mail without changing the destination address (step S34).

Here, as shown in FIG. 11, the mail address set as the destination address of this electronic mail is established in accordance with the respective combination positions on each template image, and this mail address is stored in the DB server 14 in the form of a destination address DB. For example, the mail address "template1_compo1@event1.*.co.jp" is set for the Photo No. 1 combination position of the template image for "Snap Robots!". The mail address "template1_compo2@event1.*.co.jp" is set for the Photo No. 2 combination position. The mail address "template1_compo3@event1.*.co.jp" is set for the Photo No. 3 combination position. The mail address "template1_compo4@event1.*.co.jp" is set for the photographer's face combination position.

For example, it is assumed that the user selects the Photo No. 1 combination position. In this case, as shown in FIG. 11, the mail address "template1_compo1@event1.***.co.jp" is set as the destination address. As described above, the user then attaches a shot image (user image) to the electronic mail and sends the electronic mail, without changing the established destination address (step S34).

The mail server 12 receives the electronic mail having the prescribed destination address sent by the user (step S35). The DB server 14 identifies the user DB on the basis of the sender's mail address of the electronic mail received by the mail server 12, and registers the user image attached to that electronic mail at the corresponding combination position (step S36). More specifically, as shown in FIG. 4, since various types of information are recorded in association with the user's mail address in the user DB, it is possible to identify the user DB of the corresponding user by acquiring the sender's mail address. Furthermore, the destination addresses of the electronic mails are set according to the combination positions in the template images being used, and therefore, it is possible to identify the combination position at which the user-image attached to the electronic mail is to be registered, by acquiring the mail address (destination mail address) of the received electronic mail.

When registration of the first user image that is attached to an electronic mail and sent from the user's camera-equipped mobile telephone 2 has been completed in this fashion, the mail server 12 sends an electronic mail for the next instruction to the user's camera-equipped mobile telephone 2 that sent the aforementioned electronic mail (step S37). The user receives this electronic mail sent by the mail server 12 on his or her own camera-equipped mobile telephone 2 (step S38).

Figure 12A:
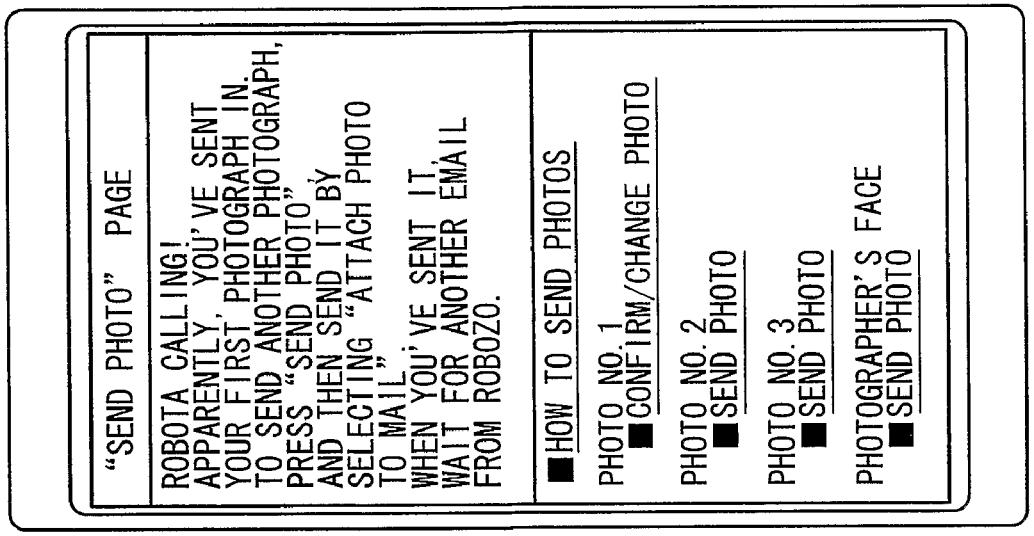
FIGS. 12A and 12B are monitor display examples of a camera-equipped mobile telephone which has accessed a web page.

FIG. 12A shows a display example of the monitor of the user's camera-equipped mobile telephone 2 when the next instruction electronic mail (replay mail) sent by the mail server 12 has been opened. As shown in FIG. 12A, the body text of this reply mail states a prescribed message, together with the URL of the web page for sending images.

Here, the contents of the reply mail vary depending on the sequence of the mails sent by the user, and the destination mail address of the electronic mail sent by the user (the combination position). The contents stated in the reply mail are stored respectively for the options (the template images), as a reply mail DB, in the DB server.

FIG. 13 shows one example of a reply mail DB set for the "Snap Robots!" option. As shown in FIG. 13, the reply mail DB contains four items, A, B, C, and D, and the contents of each item are registered in accordance with the order of the electronic mail sent by the user, and the combination position (destination mail address).

Figure 14:
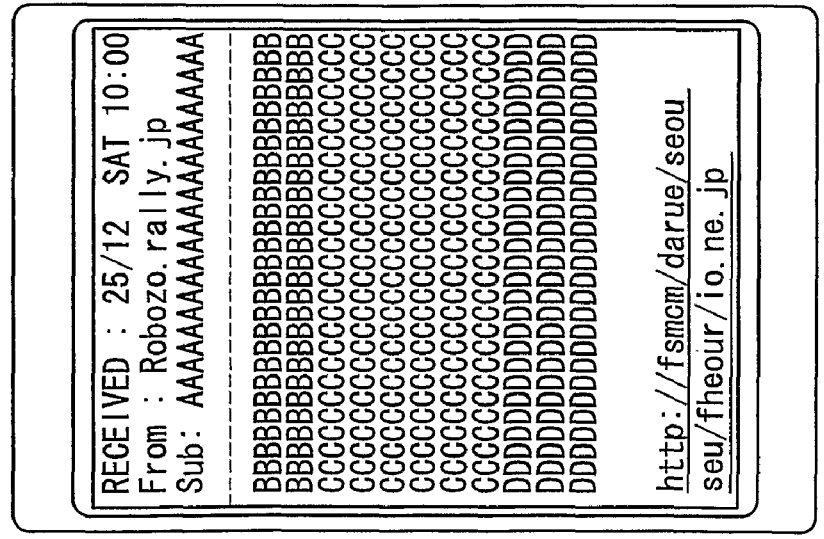
FIG. 14 is an illustrative diagram of a reply mail DB.

Here, as shown in FIG. 14, the contents stated in the "Subject (Sub)" column of the reply mail is registered in association with the item A, and the contents stated in the body text of the mail are registered in association with the items B to D.

According to this reply mail DB, if Photo No. 1 is selected as the combination position and the first image (first electronic mail) is sent, then an electronic mail is created in which the content "First picture received!" is stated in the item A column (Subject), the content "Robozo here! I got a picture from you. It's great!" is stated in the item B column (first sentence of body text), the content "What a cool robot!" is stated in the item C column (second sentence of body text), and the content "There are still three to go—We've only just started! You can also get to the "Send photo" page via this link. http://*****", is stated in the item D column (third sentence of the body text).

Furthermore, for example, if Photo No. 3 is selected as the combination position and an electronic mail with a second image is sent, then an electronic mail is created in which the content "Second picture received!" is stated in the item A column (Subject), the content "Robozo here! That's a great photo too!" is stated in the item B column (first sentence of body text), the content "That's a really charming photo!" is stated in the item C column (second sentence of body text), and the content "Still two to go—I'm waiting! You can also get to the "Send photo" page via this link. http://*****", is stated in the item D column (third sentence of the body text).

In this way, the mail server 12 refers to the reply mail DB and creates a reply mail in accordance with the order of the electronic mail sent by the user, and the destination mail address of the electronic mail sent by the user (in other words, the combination position). The reply mail thus created is sent to the user's camera-equipped mobile telephone 2 (step S37).

FIG. 12A shows the contents of a reply mail in a case where Photo No. 1 has been selected as the combination position and a first image (first electronic mail) has been sent. The user takes the next image (second image) in accordance with the contents stated in this reply mail (step S39). And then the user accesses the web page given in the reply mail (step S40), and sends the second image by means of the same procedure as the first image (step S41).

More specifically, firstly, the user clicks on the web page of the URL given in the text of the reply mail, thereby accessing the web page for sending images. The user may also directly specify the URL of the web page for sending images, in order to access that URL. Furthermore, if the URL is registered as a "bookmark" or the like, then the user may access the URL by using this registered information.

Figure 12B:
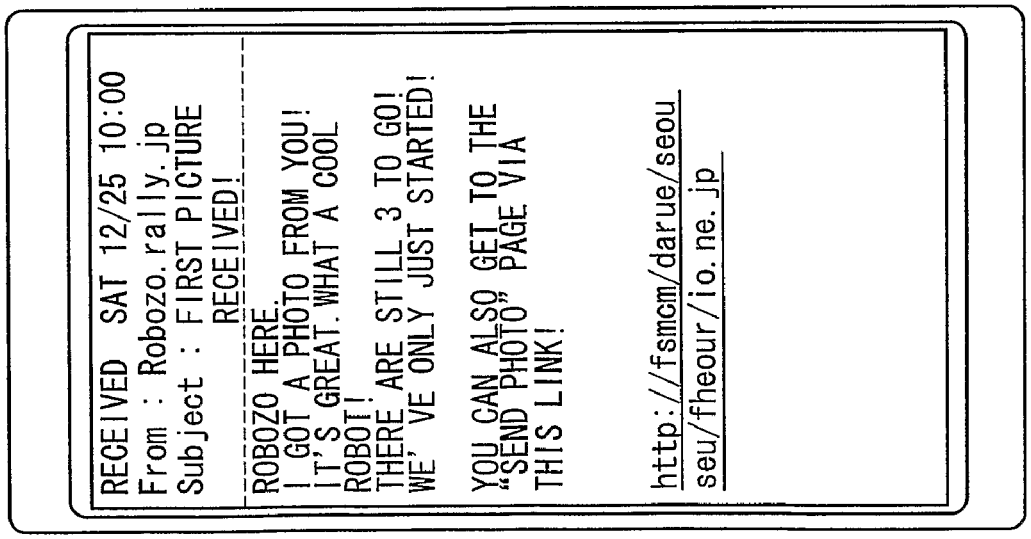

FIG. 12B shows a monitor display example of the web page. As shown in FIG. 12B, this web page shows a greeting text and advice information, and the like, as well as buttons for sending images. Similarly to the case of sending the first image, buttons for sending the images are prepared for respective combination positions, and a "#Check/Change photo" button is displayed at the combination position for which an image has already been sent. A "Send photo" button is displayed for each of the combination positions for which images have not yet been sent. In the case of the present embodiment, the first image has already been sent as an image to be combined at the Photo No. 1 combination position, and therefore a "#Check/Change photo" button is displayed for the Photo No. 1 combination position.

The WWW server 10 identifies the user on the basis of the access information sent by the user's camera-equipped mobile telephone 2, and it generates a web page on the basis of the user DB for that user.

If the user clicks on the "# Check/Change photo" button displayed on the web page for sending images, then the user's camera-equipped mobile telephone 2 accesses a linked web page for photograph checking and changing.

Figure 15B:
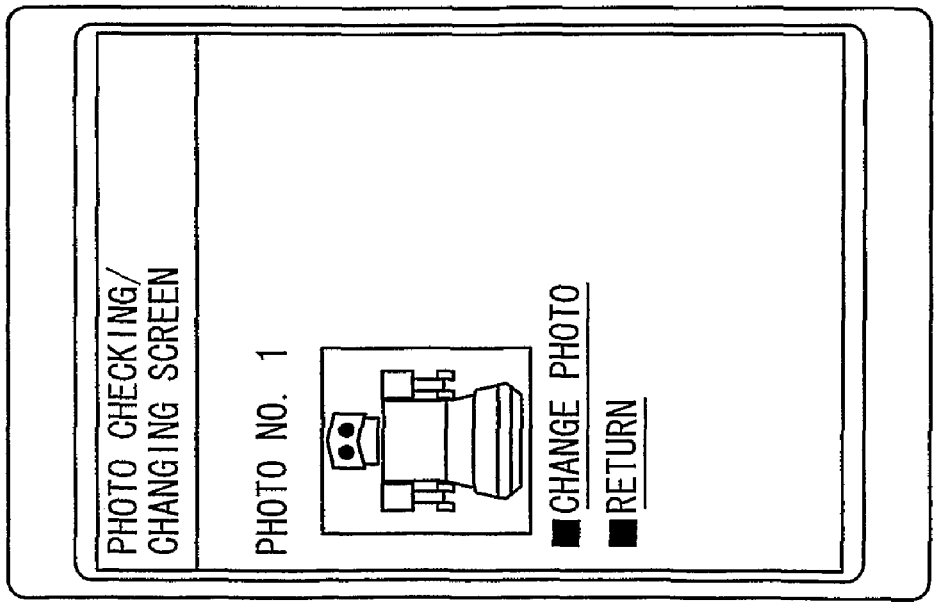
FIGS. 15A and 15B are monitor display examples of a camera-equipped mobile telephone which has accessed a web page.
Figure 15A:
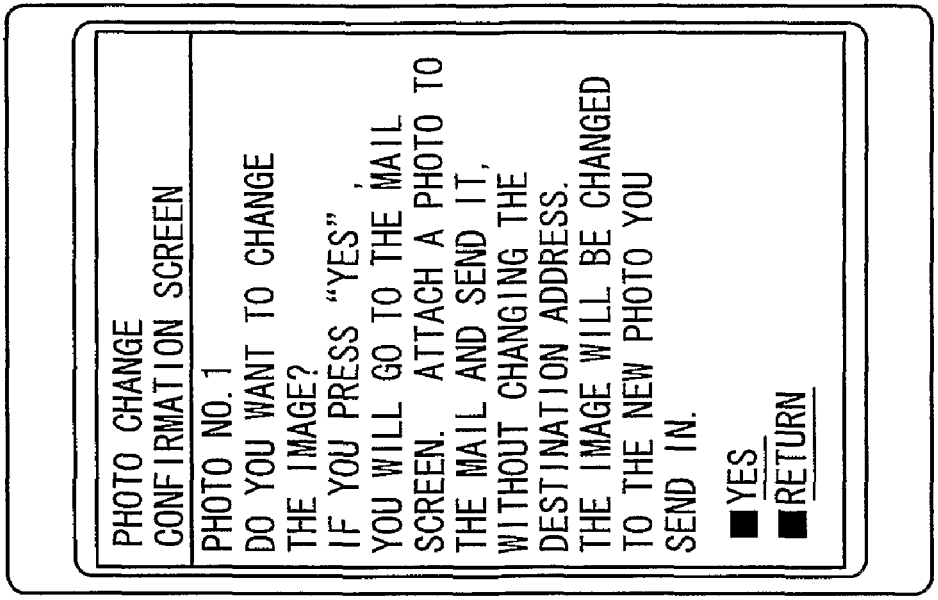

FIG. 15A shows a monitor display example of a photograph checking and changing web page. As shown in FIG. 15A, on the photograph checking and changing web page, the image sent by the user as an image to combine at the combination position in question (in this case, Photo No. 1) is displayed, together with a "# Change photo" button for providing instructions on a change of photograph and a "# Return" button for instructing the system to return to the web page for sending images. If the user clicks on the "# Change photo" button for providing instructions on a change of photograph, then the user's camera-equipped mobile telephone 2 accesses a linked photograph change confirmation web page.

FIG. 15B shows a monitor display example of this photograph change confirmation web page. As shown in FIG. 15B, on the photograph change confirmation web page, a message for confirming the change of the image sent by the user which is to be combined at that combination position (in this case, Photo No. 1) is displayed, as well as a "# Yes" button for providing instructions on a change of the photograph and a "™ Return" button for instructing the system to return to the photograph checking and changing web page. In this, the WWW server 10 reads out the registered image for the corresponding combination position, from the user DB of the user accessing the web page, and uses this image to generate the web page.

When the photograph is to be changed in accordance with the display on the web page, the user clicks on the "# Yes" button for providing instructions on a change of the photograph. When the "# Yes" button is clicked, the mail software is started up in the user's camera-equipped mobile telephone 2, and an electronic mail having a designated destination address (in this case, the mail address corresponding to Photo No. 1) is displayed on the monitor. The user attaches the changed image to the electronic mail displayed on the monitor and sends the electronic mail, without changing the destination address.

The mail server 12 receives the electronic mail sent by the user. The DB server 14 then identifies the user DB on the basis of the sender's mail address of the electronic mail received by the mail server 12, identifies the registration destination (in this case, the Photo No. 1 combination position) on the basis of the destination mail address, and registers the user image attached to the electronic mail accordingly. In this case, the newly sent image is written over the old image and registered as the user image.

In this way, even images for combination positions already sent by the user can be changed by means of the user sending another image again.

When sending a second image to a combination position for which no image has yet been sent, the user accesses the web page for sending images (step S40), and then clicks on the button corresponding to the desired combination position, from the remaining three buttons for sending images displayed on the web page.

When this button is clicked, the mail software of the camera-equipped mobile telephone 2 is started up and an electronic mail having a designated destination mail address is displayed on the monitor. The user attaches a photographed image to the electronic mail displayed on the monitor, and sends the electronic mail without changing the destination address (step S41). Here, it is assumed that the user has selected the Photo No. 2 combination position. In this case, as shown in FIG. 11, the mail address "template1_compo2@event1.***.co.jp" is set as the destination address.

The mail server 12 receives the electronic mail having the prescribed destination address sent by the user (step S42). The DB server 14 identifies the user DB on the basis of the sender's mail address of the electronic mail received by the mail server 12, and also identifies the combination position at which the image is to be registered on the basis of the destination mail address (in this case, the No. 2 Photo combination position). The user image attached to the electronic mail is then registered at the combination position in the identified user DB (step S43).

When the registration of the second user image sent by the user has been completed, the mail server 12 sends (returns) an electronic mail for the next instructions, to the camera-equipped mobile telephone 2 of the user that sent the aforementioned electronic mail (step S44).

In this case, similarly to the first reply mail described above, the mail server 12 refers to the reply mail DB stored in the DB server 14, and creates a reply mail in accordance with the order of the electronic mail sent by the user, and the destination mail address of the electronic mail sent by the user (in other words, the combination position).

The user receives the second reply mail sent by the mail server 12 on his or her own camera-equipped mobile telephone 2 (step S45).

FIG. 16A shows a monitor display example of the user's camera-equipped mobile telephone 2 in a case where the reply mail sent by the mail server 12 has been opened. As shown in FIG. 16A, a prescribed message and the URL of the web page for sending images are described in the body text of this reply mail. The user takes the next image (third image) in accordance with the contents stated in this reply mail (step S46). The user then accesses the web page given in the reply mail (step S47), and sends the third image by means of the same procedure as the first and second images (step S48).

More specifically, firstly, the user clicks on the web page of the URL given in the text of the reply mail, thereby accessing the web page for sending images. FIG. 16B shows a monitor display example of the web page. As shown in FIG. 16B, this web page shows a greeting text and advice information, and the like, as well as buttons for sending an image. Similarly to the case of sending the first and second images, buttons for sending images are prepared for respective combination positions, and "#Check/Change photo" buttons are displayed for combination positions corresponding to images that have already been sent. Furthermore, "Send photo" buttons are displayed for the combination positions for which images have not yet been sent. In the case of the present embodiment, since the first image has been sent as an image for the Photo No. 1 combination position, and the second image has been sent as an image for the Photo No. 2 combination position, then "# Check/Change photo" buttons are displayed respectively for the Photo No. 1 combination position and the Photo No. 2 combination position.

The WWW server 10 identifies the user on the basis of the access information sent by the user's camera-equipped mobile telephone 2, and generates a web page on the basis of the user DB for that user.

Furthermore, as stated previously, if the user clicks on the "# Check/Change photo" button displayed on the web page for sending images, then the user's camera-equipped mobile telephone 2 accesses the linked photograph checking and changing web page, in such a manner that the user can check and change the sent image at the combination position in question.

When sending a third image corresponding to a combination position for which no image has yet been sent, the user accesses the web page for sending images (step S47), and then clicks on the button of the desired combination position, from the remaining two buttons for sending images displayed on the web page.

When this button is clicked, the mail software in the camera-equipped mobile telephone 2 is started up and an electronic mail having a designated destination mail address is displayed on the monitor. The user attaches a photographed image to the electronic mail displayed on the monitor, and sends the electronic mail without changing the destination address (step S48). Here, it is assumed that the user has selected the Photo No. 3 combination position. In this case, as shown in FIG. 11, the mail address "template1_compo3@event1.***.co.jp" is set as the destination address.

The mail server 12 receives the electronic mail having the prescribed destination address sent by the user (step S49). The DB server 14 identifies the user DB on the basis of the sender's mail address of the electronic mail received by the mail server 12, and also identifies the combination position on the basis of the destination mail address (in this case, the No. 3 Photo combination position). The user image attached to the electronic mail is then registered at the combination position in the identified user DB (step S50).

When the registration of the third user image sent by the user has been completed, the mail server 12 sends (returns) an electronic mail for the next instructions, to the camera-equipped mobile telephone 2 of the user that sent the aforementioned electronic mail (step S51).

In this case, similarly to the first and second reply mails described above, the mail server 12 refers to the reply mail DB stored in the DB server 14, and creates a reply mail in accordance with the order of the electronic mail sent by the user and the destination mail address of the electronic mail sent by the user (in other words, the combination position).

The user receives the third reply mail sent by the mail server 12 on his or her own camera-equipped mobile telephone 2 (step S52).

FIG. 17A shows a monitor display example of the user's camera-equipped mobile telephone 2 in a case where the reply mail sent by the mail server 12 has been opened. As shown in FIG. 17A, the body text of this reply mail states a prescribed message and the URL of the web page for sending images. The user takes the next image (fourth image) in accordance with the contents stated in this reply mail (step S53). The user accesses the web page given in the reply mail (step S54), and sends the fourth image by means of the same procedure as the first to third images (step S55).

More specifically, firstly, the user clicks on the web page of the URL given in the text of the reply mail, thereby accessing the web page for sending images. FIG. 17B shows a monitor display example of the web page. As shown in FIG. 17B, this web page shows a greeting text and advice information, and the like, as well as a button for sending an image. Similarly to the case of sending the first to third images, the button for sending the image is prepared for the combination position, and "#Check/Change photo" buttons are displayed for combination positions corresponding to images that have already been sent. A "Send photo" button is displayed for the combination position for which an image has not yet been sent. In the case of the present embodiment, images have already been sent for the combination positions for Photo Nos. 1 to 3, and therefore "#Check/Change photo" buttons are displayed respectively for the Photo Nos. 1 to 3 combination positions.

The WWW server 10 identifies the user on the basis of the access information on the destination of the email sent by the user's camera-equipped mobile telephone 2, and generates a web page on the basis of the user DB for that user.

Furthermore, as stated previously, if the user clicks on the "# Check/Change photo" button displayed on the web page for sending images, then the user's camera-equipped mobile telephone 2 accesses the linked photograph checking and changing web page, in such a manner that the user can check and change the sent image corresponding to the combination position in question.

When sending a fourth image for the combination position for which no image has yet been sent, in other words, the photographer's face combination position, the user accesses the web page for sending images (step S54), and then clicks on the one remaining button for sending images displayed on the web page, in other words, the button for the photographer's face combination position.

When this button is clicked, the mail software of the camera-equipped mobile telephone 2 is started up and an electronic mail having a designated destination mail address is displayed on the monitor. The user attaches a photographed image to the electronic mail displayed on the monitor, and sends it without changing the destination address (step S55). In this case, as shown in FIG. 11, since the photographer's face is selected as the combination position, the mail address "template1_compo4@ event1.***.co.jp" is set as the destination address.

The mail server 12 receives the electronic mail having the prescribed destination address sent by the user (step S56). The DB server 14 identifies the user DB on the basis of the sender's mail address of the electronic mail received by the mail server 12, and also identifies the combination position (in this case, the photographer's face) on the basis of the destination mail address. The user image attached to the electronic mail is then registered at the combination position in the identified user DB (step S57).

By means of the sequence of steps described above, all of the user images required to create a composite photograph are assembled and the image transmission operations required of the user are completed.

When the registration of the fourth user image sent by the user has been completed, the mail server 12 sends (returns) an electronic mail indicating the completion of preparations for creating a composite photograph, to the camera-equipped mobile telephone 2 of the user which sent the aforementioned electronic mail (step S58).

In this case, similarly to the first to third reply mails described above, the mail server 12 refers to the reply mail DB stored in the DB server 14, and creates a reply mail in accordance with the order of the electronic mail sent by the user, and the destination mail address of the electronic mail sent by the user (in other words, the combination position).

The user receives the fourth reply mail sent by the mail server 12 on his or her own camera-equipped mobile telephone 2 (step S59).

Figure 18A:
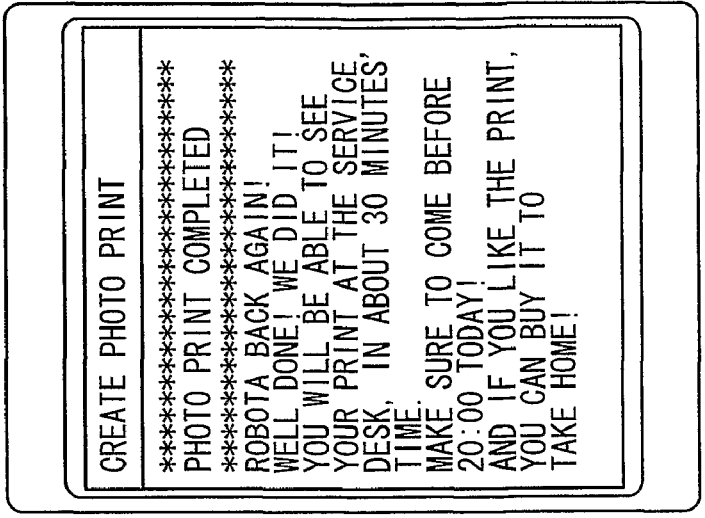
FIGS. 18A, 18B and 18C are monitor display examples of a camera-equipped mobile telephone which has accessed a web page.

FIG. 18A shows a monitor display example of the user's camera-equipped mobile telephone 2 in a case where the reply mail sent by the mail server 12 has been opened. As shown in FIG. 18A, in the body text of the reply mail, a message reporting that all of the images required to create a composite photograph have been assembled, together with the URL of a web page for requesting creation of the composite photograph (photographic print), are described.

The user reads this reply mail, and if the user is to request creation of a composite photograph (photographic print), then he or she accesses the web page stated in the reply mail (step S60). The URL given in the reply mail is set independently for each respective user, in such a manner that the user who access the URL can be identified.

Figure 18B:
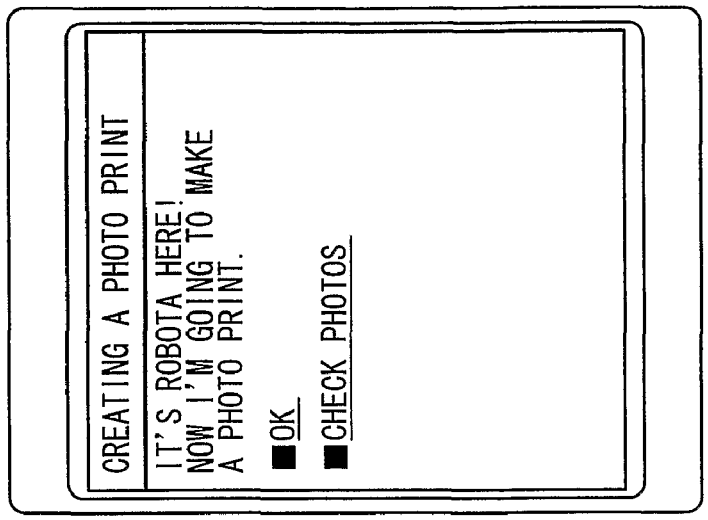

FIG. 18B shows a monitor display example of the web page. As shown in FIG. 18B, a message for confining the creation of the composite photograph (photographic print) is displayed on this web page, together with a "# OK" button for providing instructions on creation of the composite photograph, and a "# Check photos" button for checking the images (photographs).

If the user clicks on the "# Check photos" button, then the user's camera-equipped mobile telephone 2 accesses a linked photograph checking web page, in such a manner that the user can check and change the images corresponding to the respective combination positions, which have already been sent.

On the other hand, if the user clicks on the "# OK" button, then creation instruction information is sent from the user's camera-equipped mobile telephone 2 to the WWW server 10 (step S61).

When the WWW server 10 receives a creation instruction, the image processing server 16 carries out processing for creating a composite photograph for the corresponding user (step S62).

Figure 18C:
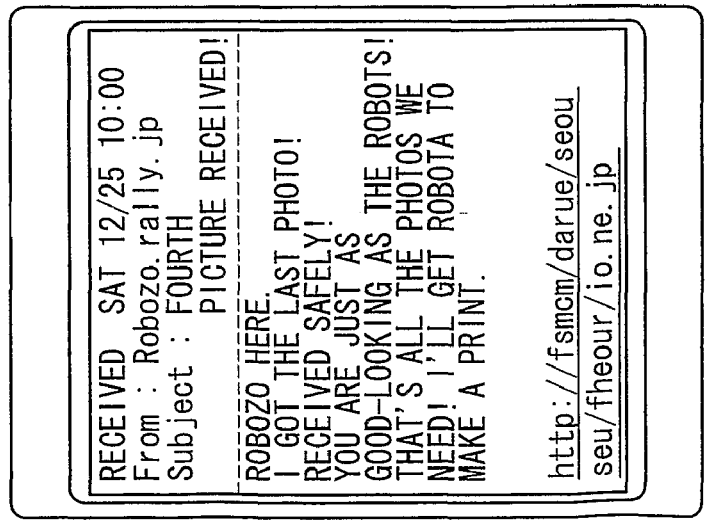

When the user clicks the "#OK" button, the user's camera-equipped mobile telephone 2 accesses the linked web page. FIG. 18C shows a monitor display example of the web page. As shown in FIG. 18C, a message reporting completion of the composite photograph, and guidance information on how to view the created composite photograph, and the like, are displayed on the monitor.

By means of the sequence of steps described above, the processing up to the composite photograph creation request is completed. Although the foregoing example related to a case where the user has selected the "Snap Robots!" option, a similar procedure is carried out if any one of the other options is selected. However, in the "Totally hilarious! Have a good laugh!" option, a "photographer's face" combination position is not prepared, and thus the user photographs images for the Photo Nos. 1 to 3 combination positions, and sends in these three images.

Next, the procedure for creating a composite photograph on the basis of images sent by the user will be described in accordance with the flowchart shown in FIG. 19.

FIG. 19 is a flowchart showing the procedure of composite photograph creation processing. When the WWW server 10 receives a composite photograph creation instruction, firstly, the image processing server 16 identifies the user DB of the corresponding user (step S70). A template image for the option selected by the user is then read out from the DB server 14, on the basis of the user DB (step S71). In the present case, since the "Snap Robots!" option is selected, the template image for "Snap Robots!" is read out (see FIG. 8).

Next, the image processing server 16 reads out the user images registered at the respective combination positions in the user DB (step S72). The user images for the respective combination positions thus read out are then attached to the corresponding combination positions on the template image, and the images are thereby combined (step S73). More specifically, the user image registered for the Photo No. 1 combination position is combined by being attached to the Photo No. 1 combination position. The user image registered for the Photo No. 2 combination position is combined by being attached to the Photo No. 2 combination position. The user image registered for the Photo No. 3 combination position is combined by being attached to the Photo No. 3 combination position. The user image registered for the photographer's face combination position is combined by being attached to the cameraman's face combination position.

The image processing server 16 then reads out tag information for the user images registered for the respective combination positions, Photo Nos. 1 to 3, in the user DB, and acquires information indicating the photo shoot time of each user image (step S74). Thereupon, a photo shoot time image is created from the photo shoot time information for each of the user images thus acquired, and the photo shoot time images are combined by attaching them to the corresponding combination positions (step S75). More specifically, a photo shoot time image for the user image registered for Photo No. 1 is combined at a photo shoot time combination position set in the vicinity of the Photo No. 1 combination position. A photo shoot time image for the user image registered for Photo No. 2 is combined at a photo shoot time combination position set in the vicinity of the Photo No. 2 combination position. A photo shoot time image for the user image registered for Photo No. 3 is combined at a photo shoot time combination position set in the vicinity of the Photo No. 3 combination position.

The photo shoot time images are generated automatically by the image processing server 16 on the basis of the acquired photo shoot time information, using a prescribed font.

Thereupon, the image processing server 16 reads out tag information for the user images registered for the respective combination positions, Photo Nos. 1 to 3, in the user DB, and acquires information indicating the photo shoot date of each user image (step S76).

Information indicating the date of use of the service may be registered in the user DB and the photo shoot date information may be acquired on the basis of this information. Furthermore, if the composite photograph is created on the same day, then it is possible that the information about the shooting day is acquired and the photo shoot date information is obtained on the basis of the information about the shooting day.

The image processing server 16 generates a photo shoot date image from the acquired photo shoot date information, and pastes that photo shoot date image at the corresponding combination position, thereby creating a composite image (step S77).

The image processing server 16 automatically generates a the photo shoot date image in a prescribed font, in accordance with the acquired photo shoot date and hour information.

By means of the aforementioned sequence of steps, a composite photograph is created. The DB server 14 registers the composite photograph created by the image processing server 16 in the user DB of the corresponding user (step S78).

Figure 20:
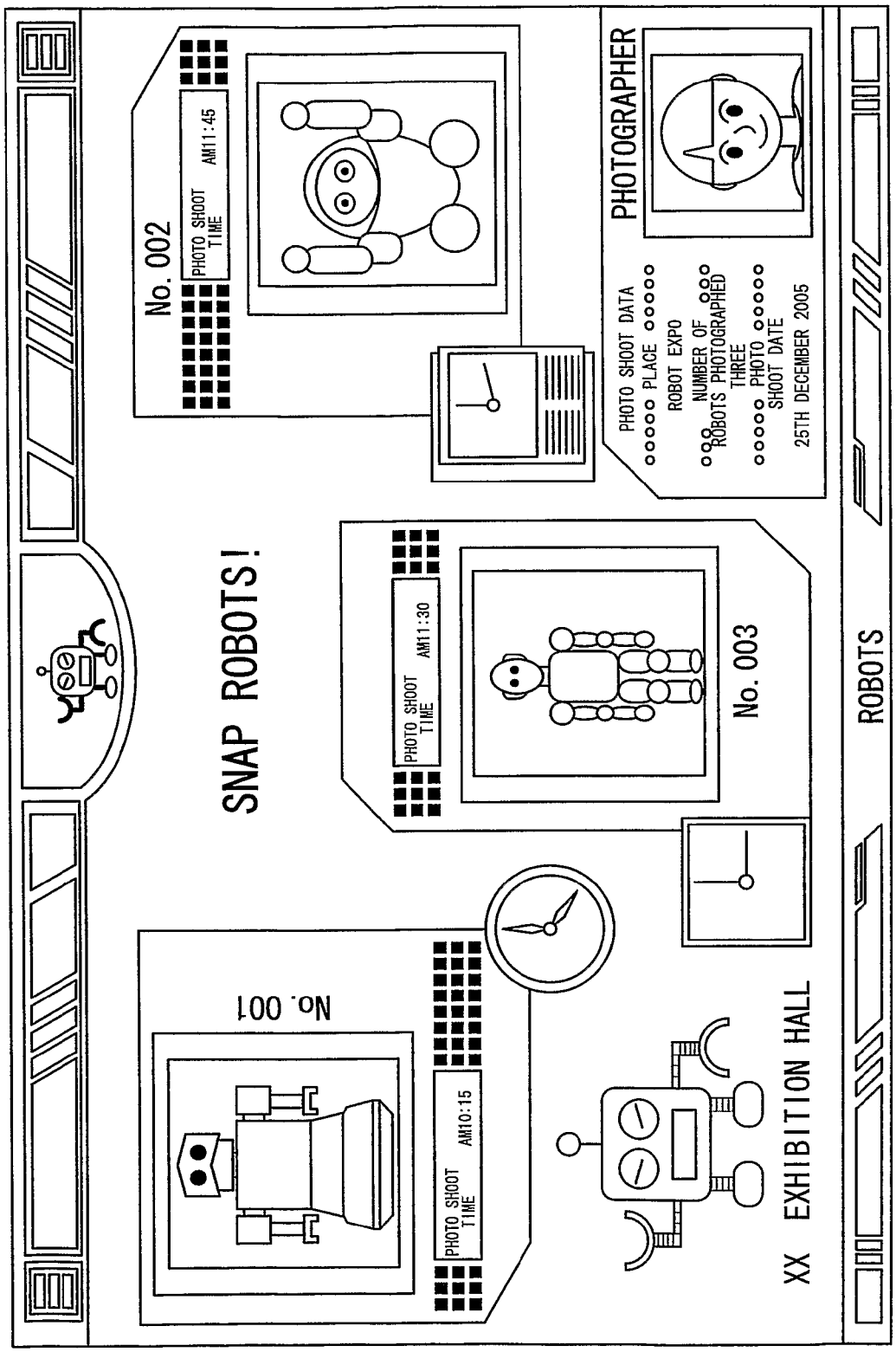
FIG. 20 shows one example of a composite photograph created when the "Snap Robots!" option has been selected.

FIG. 20 shows one example of a composite photograph created when the "Snap Robots" option has been selected. As shown in FIG. 20, an image sent as Photo No. 1 is combined at the Photo No. 1 combination position. An image sent as Photo No. 2 is combined at the Photo No. 2 combination position. An image sent as Photo No. 3 is combined at the Photo No. 3 combination position. An image sent as the face of the photographer is combined at the photographer's face combination position. Information images indicating the photo shoot times of the images combined at the Photo Nos. 1 to 3 combination positions are combined at photo shoot time combination positions provided respectively in the vicinity of the Photo Nos. 1 to 3 combination positions. An information image indicating the photo shoot date is combined at a photo shoot date combination position provided in the vicinity of the photographer's face combination position.

Composite photographs for other options are also created by means of the similar procedure. However, in the case of the "Totally hilarious! Have a good laugh!" option, as shown in FIG. 10, a content combination position is prepared on the template image. Therefore, in this case, the image processing server 16 reads out a corresponding content image from the content DB of the DB server 14, pastes the read out image over the content combination position, thereby creating the composite image.

Images relating to weather, news, advertising, characters, or the like, for example, are registered previously as contents in the content DB. Furthermore, it is also possible to select any image at random from the contents registered in the content DB and to combine the selected image with the template image. Moreover, it is also possible to determine the content image to be used in accordance with the gender and age group recorded in the user DB.

The user is able to view the composite photograph created in the manner described above, on an image display terminal 4 located in the exhibition hall. Here, it is assumed that the image display terminal 4 is situated in the service center.

Figure 21:
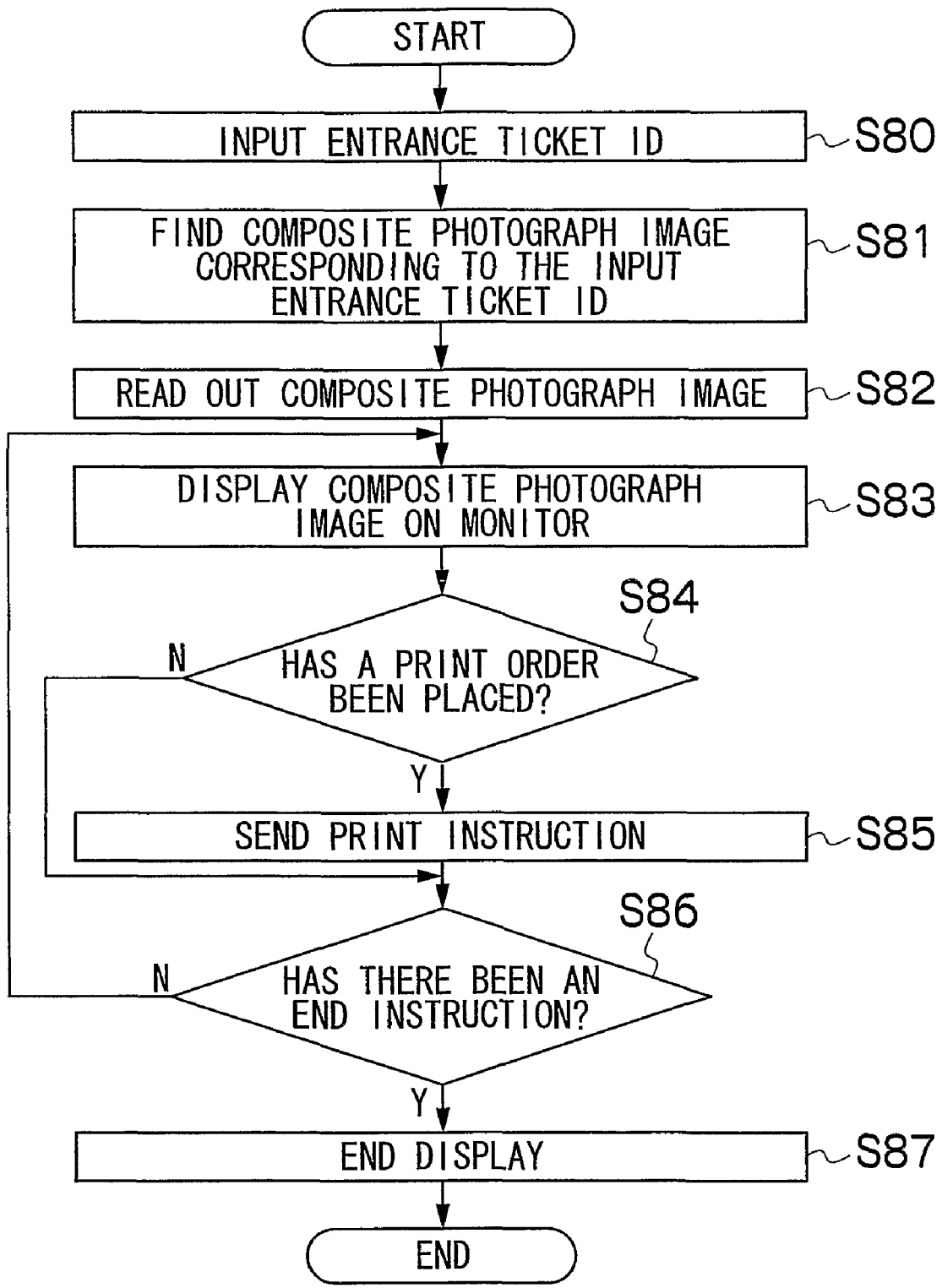
FIG. 21 is a flowchart showing the procedure of composite photograph image display processing performed by the image display terminal.

FIG. 21 is a flowchart showing the procedure of the display processing of the composite photograph image, which is performed by the image display terminal 4.

Firstly, the user goes to the service center in the hall where the image display terminal 4 is situated, and enters his or her entrance ticket ID via the keyboard of the image display terminal 4 (step S80).

The image display terminal 4 accesses the user DB of the DB server 4, and searches for a composite photograph image having the input entrance ticket ID (step S81). The composite photograph image thus searched is read out (step S82), and the read out composite photograph image is displayed on the monitor (step S83).

Figure 22:
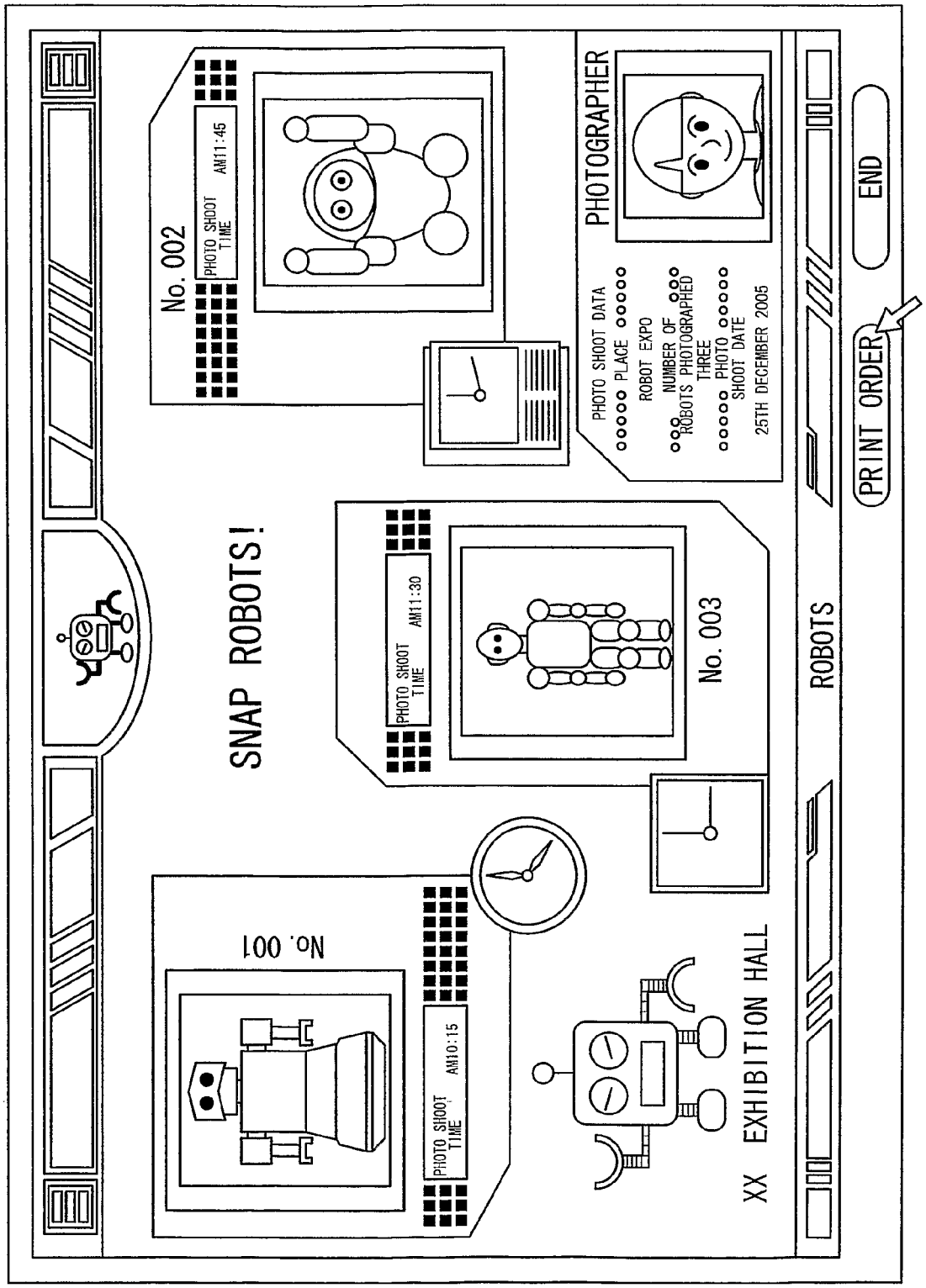
FIG. 22 is a diagram showing an example of a composite photograph image display on an image display terminal.

FIG. 22 shows one example of a monitor display of a composite photograph image. The user views the composite photograph image displayed on the monitor. As shown in FIG. 22, a "PRINT ORDER" button and an "End" button are provided on the monitor display screen. The user can place a print order for the composite photograph image displayed on the monitor by clicking on the "PRINT ORDER" button. Furthermore, by clicking on the "End" button, the user can close the image display.

The image display terminal 4 determines whether a print has been ordered or not (step S84). If the image display terminal 4 determines that a print has been ordered, then the image display terminal 4 sends a print instruction to the print server 18 (step S85). The print server 18 reads out the corresponding composite photograph image from the user DB in the DB server 14, in response to this print instruction, and causes the composite photograph image thus read out to be printed onto printing paper by the printer 20. The user receives the photographic print formed on the printing paper by the printer 20.

Furthermore, the image display terminal 4 determines whether an end instruction has been issued or not, by detecting whether the "End" button displayed on the monitor screen has been clicked (step S85). If the image display terminal 4 determines that there has been an end instruction, then the image display terminal 4 ends the display of the composite photograph image (step S86).

As described above, according to the composite photograph creation system of the present embodiment, a user is able to create a composite photograph according to a prescribed theme, in a straightforward fashion, by performing actions in accordance with the contents stated in electronic mails sent to the camera-equipped mobile telephone 2 owned by the user.

User images sent from a user's camera-equipped mobile telephone 2 by being attached to electronic mails are transmitted respectively to destinations (mail addresses) specified according to the combination positions. Therefore, it is possible to combine the user images on a template image, at positions desired by the user.

Furthermore, if the user sends an electronic mail to which an image is attached, then a corresponding reply mail is sent back to the user's camera-equipped mobile telephone 2. Therefore, the user can proceed with their tasks while exchanging mails, and hence the user is able to carry out composite photograph creation tasks in an enjoyable fashion.

Furthermore, in the present embodiment, if a combination position corresponding to the image transmission destination is selected on the web page, then an electronic mail having a destination address corresponding to this combination position is activated automatically. Therefore, the user is able to readily send an electronic mail to which an image is attached, to a prescribed destination address, without inputting a complicated destination address.

When the user sends an image, it is also possible to send an electronic mail to which an image has been attached, by means of the user manually entering the destination address corresponding to the prescribed combination position.

The user may also send a user image by sending back an electronic mail transmitted to the user's camera-equipped mobile telephone 2 from the mail server 12.

In this case, an electronic mail is sent from the mail server 12 to the user's camera-equipped mobile telephone 2, in a state where the sender's mail address is set to a mail address designated for each respective combination position. The user sends back an attached user image for each of the electronic mails for the respective combination positions sent from the mail server 12. Thereby, the user can send a user image for each of the combination positions.

In this case, the body text of the electronic mail corresponding to each combination position sent by the mail server 12 states the combination position at which the image is to be pasted, and states that a user image is to be sent by responding that electronic mail.

It is also possible to send all of the electronic mails corresponding to the combination positions at a time. It is also possible to send the electronic mails corresponding to respective combination positions, one by one, each time one image is sent. If the electronic mails corresponding to the respective combination positions are sent one by one, each time one image is sent, then it is possible to carry out the image transmission process by exchanging mails back and forth, and hence the entertainment characteristics of the service can be improved.

In the present embodiment, a camera-equipped mobile telephone is used to capture user images, to view web pages, and to send and receive electronic mails. However, the user image photographing device, the web page viewing device, and the electronic mail sending and receiving device are not limited to these. For example, the user may photograph a user image by means of a digital camera, and import the user image into a laptop personal computer, a PDA (Personal Digital Assistant), or the like, in such a manner that a web page can be viewed and electronic mails can be sent and received using these devices.

Moreover, in the present embodiment, the created composite photograph image is presented to the user by being printed on printing paper, but it may also be presented to the user in the form of digital data. For example, it is also possible to present a composite photograph image to the user, by storing image data for the created composite photograph on a CD-ROM or the like, by attaching the data to an electronic mail, or by downloading the data from a prescribed web page.

Furthermore, in the present embodiment, an image can be viewed on an image display terminal 4 situated in a hall, but the method of viewing an image is not limited to this. For example, it is also possible to publish the image on a prescribed web page, in such a manner that the user can view the image by accessing the web page. In this case, desirably, it is possible to allow only a prescribed user to view the image. For example, it is possible to restrict viewing by a third party by setting the entrance ticket ID as a password.

Moreover, in the present embodiment, the user images sent by the user are combined at the combination positions corresponding to the prescribed destination addresses in such a manner that the user images are kept in the original images. However, the present invention is not limited to this. For example, it is also possible to determine the head and tail (top and bottom) of the image in the image processing server, and if it is determined that the top and bottom should be inverted, then a message concerning this fact is sent to the user by electronic mail, thereby prompting the user to change the image. Similarly, it is also possible to determine the rotation of the user image sent by the user, and if it is determined that the image should be rotated, then a message concerning this fact is sent to the user by electronic mail, thereby prompting the user to change the image.

The top-and-bottom inverting or rotation of the user image may be corrected automatically. For example, if the candidate subjects are to be limited, then a subject DB (database for subjects) is previously prepared. In this case, the top-and-bottom inverting or rotation of the image is determined by referring to this subject DB, in such a manner that the orientation or rotation can be corrected automatically. Alternatively, a common marker that allows the top-and-bottom inverting to be determined can be provided on the subject, and the top-and-bottom inverting or rotation of the image can be corrected by recognizing this marker.

Furthermore, in the case of an image of a human face, the face region in the image may be recognized automatically, and the face image may be trimmed automatically in order that the face image is adjusted to a prescribed size.

Moreover, desirably, the state of focus of the image sent by the user is determined, and if the image is not properly focused, then a message concerning this fact is reported to the user by electronic mail, thereby prompting the user to change the image. Furthermore, if the image is not focused, then desirably, the state of focus of the image can be corrected automatically. The state of focus is determined, for example, by determining the frequency components of image signals representing the image sent by the user, and determining that an image is not properly focused if the high frequency component is less than a prescribed value.

Moreover, in the embodiment described above, a WWW service is performed by the WWW server 10, an electronic mail transmission and reception service is performed by the mail server 12, DB storage and management are performed by the DB server 14, image combination processing is performed by the image processing server 16, and image print processing is performed by the print server 18. These processes may also be carried out by a single server computer. Furthermore, these processes may be carried out in one apparatus.

Moreover, there is no particular restriction on the installation location of the system server. For example, it is possible to situate the server in the facility where the system is operated, or in a remote location. Furthermore, it is also possible to situate the plurality of servers that form the system server, respectively, in different locations.

Moreover, in the embodiment described above, the contents of the reply mail sent in response to an electronic mail sent by the user change in accordance with the order of the mail sent by the user and the destination mail address (combination position) of the mail sent by the user, on the basis of a reply mail DB. However, the rules for creating the reply mail are not limited to this.

For example, it is also possible to change the contents of the reply mail in accordance with the transmission time or reception time of the electronic mail sent by the user.

FIG. 23 shows one example of a reply mail DB where the contents of the reply mail are changed in accordance with the transmission time of the electronic mail. As shown in FIG. 23, the reply mail DB comprises five items, A, T (T1, T2, and T3), B, C, and D. The contents of each item are registered in accordance with the order of the electronic mail sent by the user, the transmission time, and the combination position (destination mail address).

Here, as shown in FIG. 24, contents to be stated in the subject line of the reply mail are registered in association with item A. Contents to be stated in the body text of the mail are registered in association with items B, T, C, and D. Item T is split further into three items, T1, T2, T3, which are set in accordance with the transmission time of the electronic mail. More specifically, contents corresponding to an electronic mail sent between 6:00 and 10:00 are registered in association with item T1. Contents corresponding to an electronic mail sent between 10:01 and 17:00 are registered in association with item T2. Contents corresponding to an electronic mail sent between 17:01 and 22:00 registered in association with item T3.

According to this reply mail DB, for example, if the user has selected Photo No. 1 as the combination position and sent the first image (first electronic mail) at 11 a.m., then an electronic mail is created in which the content "First picture received!" is stated in the item A column (Subject), the content "Hello!" is stated in the item T column (first sentence of body text), the content "Robozo here! I got a picture from you. It's great!" is stated in the item B column (second sentence of body text), the content "What a cool robot!" is stated in the item C column (third sentence of body text), and the content "There are still three to go—We've only just started! You can also get to the "Send photo" page via this link. http://*****", is stated in the item D column (fourth sentence of the body text).

Furthermore, in general, prescribed photo shoot information, such as the photo shoot date and time, the exposure conditions during photographing (shutter speed, aperture setting, sensitivity), GPS information, model name, and the like, may be appended in a tag format to an image sent by attachment to an electronic mail, as in an Exit format image file. Therefore, if an image file of this type is handled, it is possible to change the contents stated in the reply mail in accordance with the photo shoot information appended to the image file. For example, it is possible to change the contents of the reply mail in accordance with the photo shoot date and time of the image that has been sent. Furthermore, for example, it is possible to change the contents of the reply mail in accordance with the GPS information of the sent image. In this case, a reply mail DB corresponding to the particular photo shoot information, such as the photo shoot date/time, GPS information, and the like, is prepared.

The contents of a reply mail sent back to the user in this manner may be changeable on the basis of some information relating to the electronic mail sent by the user.

If information relating to the user's gender, age group, and the like, can be acquired, as in the present embodiment, then desirably, the method of representing the text and the subject line of the reply mail is made to be changeable in accordance with the user's gender, the user's age group, and/or the like.

Furthermore, desirably, the mail addresses for the combination positions are mail addresses that are combined with template information. For example, if a unique template ID is assigned to each of the template images (for instance, the template ID for "Snap Robots!" is "template1", the template ID for "My top three favorites" is "template2", and the template ID for "Totally hilarious!! Have a good laugh!!" is "template3"), then a mail address including this template ID can be set for each of the combination positions.

Furthermore, the transmission state of the images for each of the users may be checked regularly. If there is a combination position for which an image has not yet been sent, then an electronic mail indicating that an image should be sent for that combination position may be sent to the user's camera-equipped mobile telephone 2.

Although user images are sent by being attached to electronic mails in the present embodiment, the device for sending user images is not limited to this. For example, it is also possible to send user images to a prescribed transmission destination, thorough the use of FTP (File Transfer Protocol), HTTP (HyperText Transfer Protocol), and the like. If a user image is sent using FTP, for instance, then a transmission destination (URL) which is unique to the user can be set for each of the combination positions in each template image. The user sends user images through FTP to the transmission destinations specified respectively for the combination positions. The system server determines the combination position corresponding to the user image thus received, by referring to the transmission destination (URL) of the received user image.

Although a mail address (the transmission destination of the user-image) is established for each combination position of the plurality of template images in the present embodiment, the mail address (the transmission destination of the user image) may be established for each template image. In this case, if a plurality of combination positions are set for each template image, then desirably, a composite photograph is created by pasting user images sent by a user at respective combination positions, in accordance with previously established rules (combination rules).

For example, it is also possible to paste user images at prescribed combination positions in the order in which they are received. In this case, in the example of the template image shown in FIG. 8, the first received user image is combined at the "Photo No. 1" combination position, the second received user image is combined at the "Photo No. 2" combination position, and the third received user image is combined at the "Photo No. 3" combination position.

Furthermore, for example, it is possible to paste user images at prescribed combination positions in the order in which they are taken (in order of the photo shoot times). According to this, in the example of the template image shown in FIG. 8, the user image taken firstly is combined at the "Photo No. 1" combination position, the user image taken secondly is combined at the "Photo No. 2" combination position, and the image taken thirdly is combined at the "Photo No. 3" combination position.

Although the aforementioned embodiment describes an example where the composite photograph creation system according to the present invention is implemented in an exhibition hall, the present invention is not limited to this. For example, the composite photograph creation system and composite photograph creation apparatus according to the present invention may also be used in an amusement park, a zoo, an aquarium, theme park, tourist attraction, or the like.

It should be understood, however, that there is no intention to limit the invention to the specific forms disclosed, but on the contrary, the invention is to cover all modifications, alternate constructions and equivalents falling within the spirit and scope of the invention as expressed in the pasted claims.

INDUSTRIAL APPLICABILITY

As described above, according to the composite photograph creation system and composite photograph creation device on the basis of the present invention, it is possible to create a composite photograph in a simple fashion.

The invention claimed is:

1. A composite photograph creation system which creates a composite photograph by pasting a user image at a plurality of previously determined user image combination positions on a template image, the system comprising:
   a combination position mail address that is individually set for each of the plurality of the user image combination positions,
   a mail creation device which creates an electronic mail with information of the combination position mail address stated in mail text,
   sending device which sends the electronic mail created with the mail creation device to a user mail address which is the mail address of the user,
   a user terminal which receives the electronic mail sent from the sending device to the user mail address, and individually sends second electronic mail to which a user image is attached, to the combination position mail address stated in the mail text of the electronic mail;
   a reception device which receives the electronic mail sent from the user terminal to each combination position mail address; and
   a composite photograph creation device which creates the composite photograph by pasting the user image attached to the electronic mail received by the reception device, at one of the user image combination positions, in accordance with a destination mail address of the received electronic mail.

2. The composite photograph creation system as defined in claim 1, further comprising:
   a content image creation device which creates a content image to be pasted to a content image combination position set on the template image, in accordance with contents of the electronic mail received by the reception device,
   wherein the composite photograph creation device creates the composite photograph by pasting the user image attached to the electronic mail received by the reception device, at the user image combination position, and also pasting the content image created by the content image creation device, at the content image combination position.

3. The composite photograph creation system as defined in claim 1, further comprising a print device which prints the composite photograph created by the composite photograph creation device, on printing paper.

4. The composite photograph creation system as defined in claim 1, wherein:
   the mail creation device creates an electronic mail stating the information of the combination position mail address in the mail text for each of the plurality of combination position mail addresses, and the sending device individually sends the electronic mail created with the mail creation device in a predetermined order to the user's mail address.

5. The composite photograph creation system as defined in claim 4, wherein:
the sending device sends the next electronic mail to the user mail address when the electronic mail sent from the user terminal is received by the reception device.

6. The composite photograph creation system as defined in claim 1, wherein:
the mail creation device creates an electronic mail stating a predetermined message and the information of the combination position mail address in the mail text.

* * * * *